(12) United States Patent
McEneany et al.

(10) Patent No.: US 12,139,822 B2
(45) Date of Patent: Nov. 12, 2024

(54) RENEWABLE POLYESTER FIBERS HAVING A LOW DENSITY

(71) Applicant: Kimberly-Clark Worldwide, Inc., Neenah, WI (US)

(72) Inventors: Ryan J. McEneany, Appleton, WI (US); Vasily A. Topolkaraev, Appleton, WI (US); Neil T. Scholl, Neenah, WI (US); Thomas A. Eby, Greenville, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 672 days.

(21) Appl. No.: 17/111,638

(22) Filed: Dec. 4, 2020

(65) Prior Publication Data
US 2021/0180216 A1 Jun. 17, 2021

Related U.S. Application Data

(62) Division of application No. 13/370,952, filed on Feb. 10, 2012, now Pat. No. 10,858,762.

(51) Int. Cl.
*D01F 6/92* (2006.01)
*B29C 48/00* (2019.01)
(Continued)

(52) U.S. Cl.
CPC ............ *D01F 6/92* (2013.01); *B29C 48/0018* (2019.02); *B29C 48/04* (2019.02); *B29C 48/05* (2019.02);
(Continued)

(58) Field of Classification Search
CPC . D01F 6/92; D01F 1/10; B29C 48/345; B29C 48/04; B29C 48/0018; B29C 48/05;
(Continued)

(56) References Cited

U.S. PATENT DOCUMENTS 3,338,992 A 8/1967 Kinney
3,341,394 A 9/1967 Kinney
(Continued)

FOREIGN PATENT DOCUMENTS

EP 1054085 11/2000
EP 1579048 7/2001
(Continued)

OTHER PUBLICATIONS

Machine translation WO 2009/101889 (Year: 2009).*
(Continued)

*Primary Examiner* — Vincent Tatesure
(74) *Attorney, Agent, or Firm* — Dority & Manning, P.A.

(57) ABSTRACT

Fibers that are formed from a thermoplastic composition that contains a rigid renewable polyester and has a voided structure and low density are provided. To achieve such a structure, the renewable polyester is blended with a polymeric toughening additive in which the toughening additive can be dispersed as discrete physical domains within a continuous matrix of the renewable polyester. Fibers are thereafter formed and then stretched or drawn at a temperature below the glass transition temperature of the polyester (i.e., "cold drawn").

11 Claims, 2 Drawing Sheets

(51) Int. Cl.

| | |
|---|---|
| *B29C 48/04* | (2019.01) |
| *B29C 48/05* | (2019.01) |
| *B29C 48/345* | (2019.01) |
| *B29C 48/88* | (2019.01) |
| *D01D 5/12* | (2006.01) |
| *D01D 5/247* | (2006.01) |
| *D01F 1/10* | (2006.01) |
| *D04H 3/16* | (2006.01) |
| *B29C 48/80* | (2019.01) |

(52) U.S. Cl.
CPC .......... *B29C 48/345* (2019.02); *B29C 48/911* (2019.02); *D01D 5/12* (2013.01); *D01D 5/247* (2013.01); *D01F 1/10* (2013.01); *D04H 3/16* (2013.01); *B29C 48/022* (2019.02); *B29C 48/802* (2019.02); *B29C 2948/92704* (2019.02); *Y10T 428/2913* (2015.01); *Y10T 442/608* (2015.04)

(58) Field of Classification Search
CPC ........ B29C 48/911; D01D 5/12; D01D 5/247; D04H 3/16
USPC .......................................... 442/334
See application file for complete search history.

(56) References Cited

U.S. PATENT DOCUMENTS

| | | | |
|---|---|---|---|
| 3,650,649 | A | 3/1972 | Schippers |
| 3,692,618 | A | 9/1972 | Dorschner et al. |
| 3,726,955 | A | 4/1973 | Hughes et al. |
| 4,055,702 | A | 10/1977 | Guthrie et al. |
| 4,707,398 | A | 11/1987 | Boggs |
| 4,770,931 | A | 9/1988 | Pollock et al. |
| 4,797,468 | A | 1/1989 | De Vries |
| 4,937,299 | A | 6/1990 | Ewen et al. |
| 5,057,368 | A | 10/1991 | Largman et al. |
| 5,069,970 | A | 12/1991 | Largman et al. |
| 5,084,334 | A | 1/1992 | Hamano et al. |
| 5,108,820 | A | 4/1992 | Kaneko et al. |
| 5,162,074 | A | 11/1992 | Hills |
| 5,218,071 | A | 6/1993 | Tsutsui et al. |
| 5,266,610 | A | 11/1993 | Malhotra et al. |
| 5,272,236 | A | 12/1993 | Lai et al. |
| 5,277,976 | A | 1/1994 | Hogle et al. |
| 5,278,272 | A | 1/1994 | Lai et al. |
| 5,317,059 | A | 5/1994 | Chundury et al. |
| 5,322,728 | A | 6/1994 | Davey et al. |
| 5,336,552 | A | 8/1994 | Strack et al. |
| 5,382,400 | A | 1/1995 | Pike et al. |
| 5,458,971 | A | 10/1995 | Hernandez et al. |
| 5,466,410 | A | 11/1995 | Hills |
| 5,470,944 | A | 11/1995 | Bonsignore |
| 5,472,775 | A | 12/1995 | Obijeski et al. |
| 5,502,158 | A | 3/1996 | Sinclair et al. |
| 5,539,056 | A | 7/1996 | Yang et al. |
| 5,561,196 | A | 10/1996 | Kotlar et al. |
| 5,571,619 | A | 11/1996 | McAlpin et al. |
| 5,596,052 | A | 1/1997 | Resconi et al. |
| 5,686,531 | A | 11/1997 | Engelke et al. |
| 5,714,573 | A | 2/1998 | Randall et al. |
| 5,770,682 | A | 6/1998 | Ohara et al. |
| 5,807,490 | A | 9/1998 | Davis et al. |
| 5,821,327 | A | 10/1998 | Oota et al. |
| 5,844,067 | A | 12/1998 | Erneta |
| 5,880,254 | A | 3/1999 | Ohara et al. |
| 5,883,199 | A | 3/1999 | McCarthy et al. |
| 5,939,467 | A | 8/1999 | Wnuk et al. |
| 6,117,928 | A | 9/2000 | Hiltunen et al. |
| 6,153,138 | A | 11/2000 | Helms, Jr. et al. |
| 6,197,237 | B1 | 3/2001 | Tsai et al. |
| 6,200,669 | B1 | 3/2001 | Marmon et al. |
| 6,235,825 | B1 | 5/2001 | Yoshida et al. |
| 6,291,597 | B1 | 9/2001 | Gruber et al. |
| 6,309,988 | B1 | 10/2001 | Tsai et al. |
| 6,326,458 | B1 | 12/2001 | Gruber et al. |
| 6,368,503 | B1 | 4/2002 | Williamson et al. |
| 6,372,846 | B1 | 4/2002 | McGrail et al. |
| 6,500,563 | B1 | 12/2002 | Datta et al. |
| 6,509,092 | B1 | 1/2003 | Dugan |
| 6,660,211 | B2 | 12/2003 | Topolkaraev et al. |
| 6,713,175 | B1 | 3/2004 | Terada et al. |
| 6,756,331 | B2 | 6/2004 | Kasemura et al. |
| 6,811,874 | B2 | 11/2004 | Tanaka et al. |
| 6,838,403 | B2 | 1/2005 | Tsai et al. |
| 6,869,985 | B2 | 3/2005 | Mohanty et al. |
| 6,905,759 | B2 | 6/2005 | Topolkaraev et al. |
| 6,914,018 | B1 | 7/2005 | Uitenbroek et al. |
| 6,949,288 | B2 | 9/2005 | Hodge et al. |
| 7,135,523 | B2 | 11/2006 | Ho et al. |
| 7,157,032 | B2 | 1/2007 | Eloo |
| 7,256,223 | B2 | 8/2007 | Mohanty et al. |
| 7,273,894 | B2 | 9/2007 | Shelby et al. |
| 7,354,973 | B2 | 4/2008 | Flexman |
| 7,368,503 | B2 | 5/2008 | Hale |
| 7,393,590 | B2 | 7/2008 | Scheer et al. |
| 7,514,503 | B2 | 4/2009 | Nakamichi et al. |
| 7,566,753 | B2 | 7/2009 | Randall et al. |
| 7,619,132 | B2 | 11/2009 | Topolkaraev et al. |
| 7,872,056 | B2 | 1/2011 | Cheung et al. |
| 7,977,397 | B2 | 7/2011 | Cheung et al. |
| 7,989,062 | B2 | 8/2011 | Chakravarty et al. |
| 7,994,078 | B2 | 8/2011 | Reichmann et al. |
| 8,022,139 | B2 | 9/2011 | Kurihara et al. |
| 8,026,309 | B2 | 9/2011 | Halahmi et al. |
| 8,030,382 | B2 | 10/2011 | Endo et al. |
| 8,044,134 | B2 | 10/2011 | Chung et al. |
| 8,075,994 | B2 | 12/2011 | Sakamoto et al. |
| 8,076,406 | B2 | 12/2011 | Brule et al. |
| 8,188,188 | B2 | 5/2012 | Kobayashi et al. |
| 8,236,893 | B2 | 8/2012 | Nakagawa et al. |
| 8,268,738 | B2 | 9/2012 | McEneany et al. |
| 8,268,913 | B2 | 9/2012 | Li et al. |
| 8,287,677 | B2 | 10/2012 | Lake et al. |
| 8,334,327 | B2 | 12/2012 | Kaufman et al. |
| 8,334,348 | B2 | 12/2012 | Hogt et al. |
| 8,362,145 | B2 | 1/2013 | Li et al. |
| 8,372,917 | B2 | 2/2013 | Li et al. |
| 8,410,215 | B2 | 4/2013 | Sano et al. |
| 8,415,008 | B2 | 4/2013 | Ito et al. |
| 8,420,193 | B2 | 4/2013 | Hiruma et al. |
| 8,444,905 | B2 | 5/2013 | Li et al. |
| 8,466,337 | B2 | 6/2013 | Wang et al. |
| 8,709,591 | B2 | 4/2014 | Sumi et al. |
| 9,194,065 | B2 | 11/2015 | Moore et al. |
| 2003/0039775 | A1 | 2/2003 | Kong |
| 2003/0105231 | A1 | 6/2003 | Miller |
| 2003/0153684 | A1 | 8/2003 | Miller |
| 2003/0162013 | A1 | 8/2003 | Topolkaraev et al. |
| 2004/0038028 | A1 | 2/2004 | Tanaka et al. |
| 2005/0112363 | A1 | 5/2005 | Ning |
| 2005/0221075 | A1 | 10/2005 | Travelute et al. |
| 2007/0182041 | A1 | 8/2007 | Rizk et al. |
| 2008/0042312 | A1 | 2/2008 | Chen et al. |
| 2008/0147165 | A1 | 6/2008 | Hossainy et al. |
| 2008/0287026 | A1 | 11/2008 | Chakravarty et al. |
| 2008/0311814 | A1 | 12/2008 | O'Sickey et al. |
| 2009/0060860 | A1 | 3/2009 | Almenar et al. |
| 2009/0068463 | A1 | 3/2009 | Mochizuki et al. |
| 2009/0069463 | A1 | 3/2009 | Serizawa et al. |
| 2009/0124956 | A1 | 5/2009 | Swetlin et al. |
| 2009/0157022 | A1 | 6/2009 | MacDonald et al. |
| 2009/0274871 | A1 | 11/2009 | Takahashi et al. |
| 2009/0311937 | A1 | 12/2009 | He et al. |
| 2009/0324911 | A1 | 12/2009 | Li et al. |
| 2009/0326152 | A1* | 12/2009 | Li ..................... B29C 48/022 525/190 |
| 2010/0048082 | A1 | 2/2010 | Topolkaraev et al. |
| 2010/0056656 | A1 | 3/2010 | Matsuoka et al. |
| 2010/0093888 | A1 | 4/2010 | Nakamura |
| 2010/0112357 | A1 | 5/2010 | Fine et al. |
| 2010/0143717 | A1 | 6/2010 | Sakamoto et al. |
| 2011/0028062 | A1 | 2/2011 | Chester et al. |

(56) References Cited

U.S. PATENT DOCUMENTS

| | | |
|---|---|---|
| 2011/0046281 A1 | 2/2011 | Scheer et al. |
| 2011/0071238 A1 | 3/2011 | Bastioli et al. |
| 2011/0132519 A1 | 6/2011 | Li et al. |
| 2011/0144273 A1 | 6/2011 | Li et al. |
| 2011/0178196 A1 | 7/2011 | Steinke et al. |
| 2011/0190447 A1 | 8/2011 | Li et al. |
| 2011/0195210 A1 | 8/2011 | Li et al. |
| 2011/0245420 A1 | 10/2011 | Rasal et al. |
| 2011/0251346 A1 | 10/2011 | Li et al. |
| 2012/0040185 A1 | 2/2012 | Topolkaraev et al. |
| 2012/0040582 A1 | 2/2012 | Topolkaraev et al. |
| 2012/0214944 A1 | 8/2012 | Li et al. |

FOREIGN PATENT DOCUMENTS

| | | |
|---|---|---|
| EP | 1361039 | 11/2003 |
| EP | 1725614 | 8/2008 |
| EP | 2096198 | 9/2009 |
| GB | 1385105 | 2/1975 |
| WO | WO9853141 | 11/1998 |
| WO | WO0114621 | 3/2001 |
| WO | WO0134886 | 5/2001 |
| WO | WO03049589 | 6/2003 |
| WO | WO03066704 | 8/2003 |
| WO | WO2007092417 | 8/2007 |
| WO | WO2007115081 | 10/2007 |
| WO | WO2008020726 | 2/2008 |
| WO | WO2008030599 | 3/2008 |
| WO | WO2008079784 | 7/2008 |
| WO | WO2008130226 | 10/2008 |
| WO | WO2009012284 | 1/2009 |
| WO | WO-2009101889 A1 * 8/2009 ............... D01D 5/16 |
| WO | WO2009145778 | 12/2009 |
| WO | WO2009151437 | 12/2009 |
| WO | WO2009151439 | 12/2009 |
| WO | WO2010002669 | 1/2010 |
| WO | WO2011080623 | 7/2011 |
| WO | WO2011084670 | 7/2011 |
| WO | WO2012020336 | 2/2012 |

OTHER PUBLICATIONS

Abstract of Japanese Patent—JP2010280921 dated Dec. 16, 2010, 1 page.
Machine Translation of JPH09059498, Mar. 4, 1997.
Machine Translation of JP2005-088600, Apr. 7, 2005.
Machine Translation of JP2007-270076, Oct. 18, 2007.
Machine Translation of JP2009-197099, Sep. 3, 2009.
Machine Translation of JP2010-001369, Jan. 7, 2010.
Machine Translation of JP2010-046852, Mar. 4, 2010.
Abstract of Japanese Patent—JP2006345920, Dec. 28, 2006, 2 pages.
Abstract and Machine Translation of Japanese patent—JP2007161825, Jun. 28, 2007, 23 pages.
Abstract of Korean Patent—KR20080072740, Aug. 6, 2008, 1 page.
Abstract of Korean Patent—KR20090024709, Mar. 9, 2009, 1 page.
Abstract of Korean Patent—KR20090034199, Apr. 7, 2009, 1 page.
Abstract of Article—Balakrishnan et al., "Mechanical, Thermal, and Morphological Properties of Polylactic Acid/Linear Low Density Polyethylene Blends," *Journal of Elastomers and Plastics*, vol. 42, No. 3, May 2010, pp. 223-239.
Article—Balakrishnan et al., "Novel toughened polylactic acid nanocomposite: Mechanical, thermal and morphological properties," *Materials and Design*, vol. 31, 2010, pp. 3289-3298.
Article—Chalamet et al., "Carboxyl Terminated Polyamide 12 Chain Extension by Reactive Extrusion Using a Dioxazoline Coupling Agent. Part I: ExtrusionParameters Anaylsis," *Polymer Engineering and Science*, vol. 40, No. 1, Jan. 2000, pp. 263-274.
Article—Chalamet et al., "Carboxyl Terminated Polyamide 12 Chain Extension by Reactive Extrusion Using a Dioxazoline Coupling Agent. Part II: Effects of Extrusion Conditions," *Polymer Engineering and Science*, vol. 40, No. 12, Dec. 2002, pp. 2317-2327.
Article—Gramlich et al., "Reactive Compatibilization of Poly(L-lactide) and Conjugated Soybean Oil," *Macromolecules*, vol. 43, No. 5, 2010, pp. 2313-2321.
Article—Japon et al., "Reactive processing of poly(ethylene terephthalate) modified with multifunctional epoxy-based additives," *Polymer*, vol. 41, 2000, pp. 5809-5818.
Article—Jing et al., "A Bifunctional Monomer Derived from Lactide for Toughening Polylactide," *J. Am. Chem. Soc.*, vol. 130, No. 42, 2008, pp. 13826-13867.
Article—Hideko T. Oyama, "Super-tough poly(lactic acid) materials: Reactive blending with ethylene copolymer," *Polymer*, vol. 50, 2009, pp. 747-751.
Article—Robertson et al., "Toughening of Polylactide with Polymerized Soybean Oil," *Macromolecules*, vol. 43, 2010, pp. 1807-1814.
Article—Sun et al., "Toughening of poly(butylene terephthalate) with epoxy-functionalized acrylonitrile-butadiene-styrene," *Polymer*, vol. 43, 2005, pp. 7632-7643.
Article—Xanthos et al., "Reactive Modification of Polyethylene Terephthalate With Polyepoxides," *Polymer Engineering and Science*, vol. 41, No. 4, Apr. 2001, pp. 643-655.
Article—Zhang et al., "Preparation and properties of biodegradable poly(lactic acid)/poly(butylene adipate-co-terephthalate) blend with glycidyl methyacrylate as reactive processing agent," *J. Mater. Sci.*, vol. 44, 2009, pp. 250-256.
Part of Book—Biopolymers, vol. 4, Polyester III, Applications and Commercial Products, Edited by Y. Doi and A. Steinbüchel—Polylactides by Prof. Dr. Hideto Tsuji, 2002, pp. 129-177.
Part of Book—Handbook of Plasticizers, $2^{nd}$ Edition, 2004, 2012—Theories of Compatability by Yu et al.
Technology Focus Report: Blends of PLA with Other Thermoplastics from Nature Works®, Feb. 7, 2007, 6 pages.
Technology Focus Report : Toughened PLA from NatureWorks®, Mar. 1, 2007, 5 pages.
Product Information—PLA Processing Guide for Spinning Fibers from Nature Works®, Mar. 15, 2005, 14 pages.
Product Information—NatureWorks® PLA Polymer 6201D—Fiber Melt Spinning from Nature Works®, 2005, 3 pages.
Product Information on Lotader® AX8950, 2004, 2 pages.
Product Information—Lotader® Applications—Impact modifier for engineer plastics, Jan. 3, 2012, 1 page.
Related US Application Form.
Search Report and Written Opinion for PCT/IB2013/050729 dated Jul. 31, 2013, 13 pages.
Supplementary European Search Report, Oct. 6, 2015, 8 pages.

* cited by examiner

RENEWABLE POLYESTER FIBERS HAVING A LOW DENSITY

CROSS REFERENCE TO RELATED APPLICATIONS

This application is a divisional application from U.S. patent application Ser. No. 13/370,952, having a filing date of Feb. 10, 2012, which is incorporated herein in its entirety by reference.

BACKGROUND OF THE INVENTION

Various attempts have been made to use renewable polyesters (e.g., polylactic acid ("PLA")) in fibers. However, market penetration of renewable polyesters has been limited due to a density that is approximately 30% higher than conventional polyolefins, which makes them significantly more expensive. To help reduce the density of such polyesters, gaseous blowing agents are sometimes employed to help create a cellular "foamed" structure having a certain degree of porosity. Unfortunately, however, the processability and tensile properties of the resulting cellular structure is often compromised due to the uncontrolled pore size and distribution. Other problems also exist. Renewable polyesters, for example, have a relatively high glass transition temperature and typically demonstrate a very high stiffness, while having relatively low ductility/elongations at break. As an example, polylactic acid has a glass transition temperature of about 59° C. and a tensile elongation (at break) of only about 5%. Such low tensile elongation values significantly limit the use of such polymers in fibers, where a good balance between strength and ductility is required.

As such, a need currently exists for low density renewable polyester fibers that can also demonstrate good mechanical properties.

SUMMARY OF THE INVENTION

In accordance with one embodiment of the present invention, a fiber is disclosed that is formed from a thermoplastic composition. The composition comprises at least one rigid renewable polyester having a glass transition temperature of about 0° C. or more, from about about 1 wt. % to about 30 wt. % of at least one polymeric toughening additive based on the weight of the renewable polyester, from about about 0.1 wt. % to about 20 wt. % of at least one interphase modifier based on the weight of the renewable polyester. The thermoplastic composition has a morphology in which a plurality of discrete primary domains and voids are dispersed within a continuous phase, the domains containing the polymeric toughening additive and the continuous phase containing the renewable polyester. The fiber has a density of about 1.4 grams per cubic centimeter or less, and the average percent volume of the composition that is occupied by the voids is from about 20% to about 80% per cubic centimeter.

In accordance with another embodiment of the present invention, a method for forming a low density fiber is disclosed that comprises forming a blend that contains a rigid renewable polyester and a polymeric toughening additive, wherein the rigid renewable polyester has a glass transition temperature of about 0° C. or more; extruding the blend through a die to form the fiber; and drawing the fiber at a temperature that is lower than the glass transition temperature of the renewable polyester to form a thermoplastic composition that contains a plurality of voids and has a density of about 1.4 grams per cubic centimeter or less.

In accordance with yet another embodiment of the present invention, a method for forming a nonwoven web is disclosed that comprises randomly depositing a plurality of fibers onto a forming surface. The fibers may be formed from a blend, such as described herein. The method further comprising drawing the fibers before and/or after the nonwoven web is formed, wherein the fibers are drawn at a temperature that is lower than the glass transition temperature of the renewable polyester to form a thermoplastic composition that contains a plurality of voids and has a density of about 1.4 grams per cubic centimeter or less.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
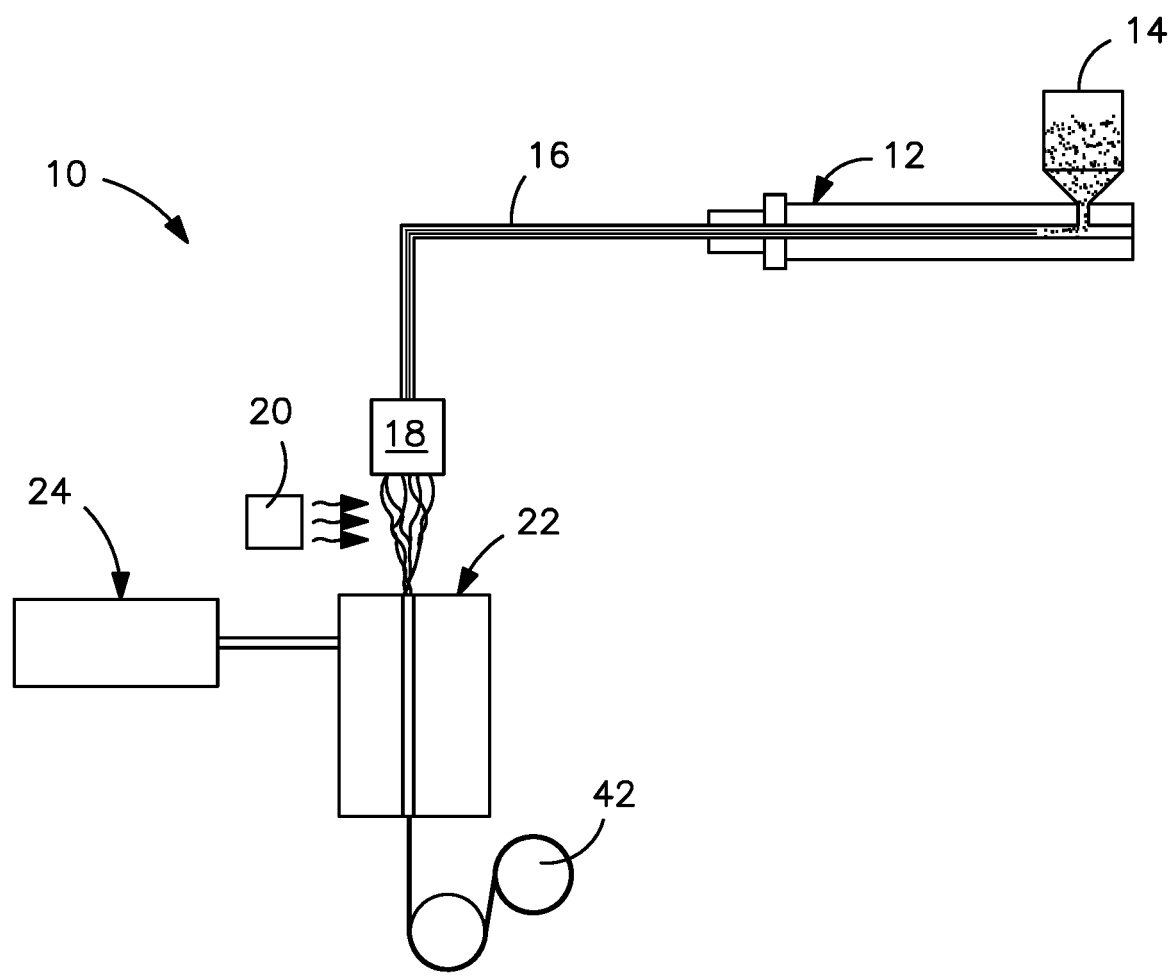
FIG. 1 is a schematic illustration of a process that may be used in one embodiment of the present invention to form fibers.

Repeat use of references characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Definitions

As used herein, the term "fibers" refer to elongated extrudates formed by passing a polymer through a forming orifice such as a die. Unless noted otherwise, the term "fibers" includes both discontinuous fibers having a definite length and substantially continuous filaments. Substantially filaments may, for instance, have a length much greater than their diameter, such as a length to diameter ratio ("aspect ratio") greater than about 15,000 to 1, and in some cases, greater than about 50,000 to 1.

As used herein, the term "monocomponent" refers to fibers formed from one polymer. Of course, this does not exclude fibers to which additives have been added for color, anti-static properties, lubrication, hydrophilicity, liquid repellency, etc.

As used herein, the term "multicomponent" refers to fibers formed from at least two polymers (e.g., bicomponent fibers) that are extruded from separate extruders. The polymers are arranged in substantially constantly positioned distinct zones across the cross-section of the fibers. The components may be arranged in any desired configuration, such as sheath-core, side-by-side, segmented pie, island-in-the-sea, and so forth. Various methods for forming multicomponent fibers are described in U.S. Pat. No. 4,789,592 to Taniguchi et al. and U.S. Pat. No. 5,336,552 to Strack et al., 5,108,820 to Kaneko, et al., U.S. Pat. No. 4,795,668 to Kruege, et al., U.S. Pat. No. 5,382,400 to Pike, et al., U.S. Pat. No. 5,336,552 to Strack, et al., and U.S. Pat. No. 6,200,669 to Marmon, et al. Multicomponent fibers having various irregular shapes may also be formed, such as described in U.S. Pat. No. 5,277,976 to Hogle, et al., U.S. Pat. No. 5,162,074 to Hills, U.S. Pat. No. 5,466,410 to Hills, U.S. Pat. No. 5,069,970 to Largman, et al., and U.S. Pat. No. 5,057,368 to Largman, et al.

As used herein, the term "nonwoven web" refers to a web having a structure of individual fibers that are randomly interlaid, not in an identifiable manner as in a knitted fabric. Nonwoven webs include, for example, meltblown webs, spunbond webs, carded webs, wet-laid webs, airlaid webs, coform webs, hydraulically entangled webs, etc. The basis weight of the nonwoven web may generally vary, but is typically from about 5 grams per square meter ("gsm") to 200 gsm, in some embodiments from about 10 gsm to about 150 gsm, and in some embodiments, from about 15 gsm to about 100 gsm.

As used herein, the term "meltblown" web or layer generally refers to a nonwoven web that is formed by a process in which a molten thermoplastic material is extruded through a plurality of fine, usually circular, die capillaries as molten fibers into converging high velocity gas (e.g., air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al.; U.S. Pat. No. 4,307,143 to Meitner, et al.; and U.S. Pat. No. 4,707,398 to Wisneski, et al. Meltblown fibers may be substantially continuous or discontinuous, and are generally tacky when deposited onto a collecting surface.

As used herein, the term "spunbond" web or layer generally refers to a nonwoven web containing small diameter substantially continuous filaments. The filaments are formed by extruding a molten thermoplastic material from a plurality of fine, usually circular, capillaries of a spinnerette with the diameter of the extruded filaments then being rapidly reduced as by, for example, eductive drawing and/or other well-known spunbonding mechanisms. The production of spunbond webs is described and illustrated, for example, in U.S. Pat. No. 4,340,563 to Appel, et al., U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S. Pat. No. 3,542,615 to Dobo, et al., and U.S. Pat. No. 5,382,400 to Pike, et al. Spunbond filaments are generally not tacky when they are deposited onto a collecting surface. Spunbond filaments may sometimes have diameters less than about 40 micrometers, and are often between about 5 to about 20 micrometers.

DETAILED DESCRIPTION

Generally speaking, the present invention is directed to fibers that are formed from a thermoplastic composition that contains a rigid renewable polyester and has a voided structure and low density. To achieve such a structure, the renewable polyester is blended with a polymeric toughening additive in which the toughening additive can be dispersed as discrete physical domains within a continuous matrix of the renewable polyester. Fibers are thereafter formed and then stretched or drawn at a temperature below the glass transition temperature of the polyester (i.e., "cold drawn"). Without intending to be limited by theory, the present inventors believe that the deformation force and elongational strain of the drawing process causes debonding to occur in the renewable polyester matrix at those areas located adjacent to the discrete domains. This creates a network of voids (e.g., micro-voids, nano-voids, or a combination thereof) located adjacent to the discrete domains, which as a result of their proximal location, can form a bridge between the boundaries of the voids and act as internal structural "hinges" that help stabilize the network and increase its ability to dissipate energy.

The average percent volume occupied by the voids within a given unit volume of the fibers can be relatively high, such as from about 20% to about 80% per cm$^3$, in some embodiments from about 30% to about 70%, and in some embodiments, from about 40% to about 60% per cubic centimeter of the composition. Such a high void volume significantly lowers the density of the fibers. For example, the resulting fibers may have a density of about 1.4 grams per cubic centimeter ("g/cm$^3$") or less, in some embodiments from about 0.4 g/cm$^3$ to about 1.1 g/cm$^3$, and in some embodiments, from about 0.5 g/cm$^3$ to about 0.95 g/cm$^3$. The present inventors have also discovered that the voids can be distributed in a substantially homogeneous fashion throughout the composition. For example, the voids may be distributed in columns that are oriented in a direction generally perpendicular to the direction in which a stress is applied. These columns may be generally parallel to each other across the width of the composition. Without intending to be limited by theory, it is believed that the presence of such a homogeneously distributed voided network can result in in significant energy dissipation under load. This is stark contrast to conventional techniques for creating voids that involve the use of blowing agents to initiate pore formation, which tend to result in an uncontrolled pore distribution and poor mechanical properties.

Various embodiments of the present invention will now be described in more detail.

I. Thermoplastic Composition

A. Renewable Polyester

Renewable polyesters typically constitute from about 70 wt. % to about 99 wt. %, in some embodiments from about 75 wt. % to about 98 wt. %, and in some embodiments, from about 80 wt. % to about 95 wt. % of the thermoplastic composition. Any of a variety of renewable polyesters may generally be employed in the thermoplastic composition, such as aliphatic polyesters, such as polycaprolactone, polyesteramides, polylactic acid (PLA) and its copolymers, polyglycolic acid, polyalkylene carbonates (e.g., polyethylene carbonate), poly-3-hydroxybutyrate (PHB), poly-3-hydroxyvalerate (PHV), poly-3-hydroxybutyrate-co-4-hydroybutyrate, poly-3-hydroxybutyrate-co-3-hydroxyvalerate copolymers (PHBV), poly-3-hydroxybutyrate-co-3-hydroxyhexanoate, poly-3-hydroxybutyrate-co-3-hydroxyoctanoate, poly-3-hydroxybutyrate-co-3-hydroxydecanoate, poly-3-hydroxybutyrate-co-3-hydroxyoctadecanoate, and succinate-based aliphatic polymers (e.g., polybutylene succinate, polybutylene succinate adipate, polyethylene succinate, etc.); aliphatic-aromatic copolyesters (e.g., polybutylene adipate terephthalate, polyethylene adipate terephthalate, polyethylene adipate isophthalate, polybutylene adipate isophthalate, etc.); aromatic polyesters (e.g., polyethylene terephthalate, polybutylene terephthalate, etc.); and so forth.

Typically, the thermoplastic composition contains at least one renewable polyester that is rigid in nature and thus has a relatively high glass transition temperature. For example, the glass transition temperature ("$T_g$") may be about 0° C. or more, in some embodiments from about 5° C. to about 100° C., in some embodiments from about 30° C. to about 80° C., and in some embodiments, from about 50° C. to about 75° C. The renewable polyester may also have a melting temperature of from about 140° C. to about 260° C., in some embodiments from about 150° C. to about 250° C., and in some embodiments, from about 160° C. to about 220° C. The melting temperature may be determined using differential scanning calorimetry ("DSC") in accordance with ASTM D-3417. The glass transition temperature may be determined by dynamic mechanical analysis in accordance with ASTM E1640-09.

One particularly suitable rigid polyester is polylactic acid, which may generally be derived from monomer units of any isomer of lactic acid, such as levorotory-lactic acid ("L-lactic acid"), dextrorotatory-lactic acid ("D-lactic acid"), meso-lactic acid, or mixtures thereof. Monomer units may also be formed from anhydrides of any isomer of lactic acid, including L-lactide, D-lactide, meso-lactide, or mixtures thereof. Cyclic dimers of such lactic acids and/or lactides may also be employed. Any known polymerization method, such as polycondensation or ring-opening polymerization, may be used to polymerize lactic acid. A small amount of a chain-extending agent (e.g., a diisocyanate compound, an epoxy compound or an acid anhydride) may also be employed. The polylactic acid may be a homopolymer or a copolymer, such as one that contains monomer units derived from L-lactic acid and monomer units derived from D-lactic acid. Although not required, the rate of content of one of the monomer unit derived from L-lactic acid and the monomer unit derived from D-lactic acid is preferably about 85 mole % or more, in some embodiments about 90 mole % or more, and in some embodiments, about 95 mole % or more. Multiple polylactic acids, each having a different ratio between the monomer unit derived from L-lactic acid and the monomer unit derived from D-lactic acid, may be blended at an arbitrary percentage. Of course, polylactic acid may also be blended with other types of polymers (e.g., polyolefins, polyesters, etc.).

In one particular embodiment, the polylactic acid has the following general structure:

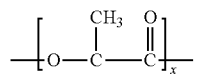

One specific example of a suitable polylactic acid polymer that may be used in the present invention is commercially available from Biomer, Inc. of Krailling, Germany) under the name BIOMER™ L9000. Other suitable polylactic acid polymers are commercially available from Natureworks LLC of Minnetonka, Minnesota (NATUREWORKS®) or Mitsui Chemical (LACEA™). Still other suitable polylactic acids may be described in U.S. Pat. Nos. 4,797,468; 5,470,944; 5,770,682; 5,821,327; 5,880,254; and 6,326,458, which are incorporated herein in their entirety by reference thereto for all purposes.

The polylactic acid typically has a number average molecular weight ("$M_n$") ranging from about 40,000 to about 160,000 grams per mole, in some embodiments from about 50,000 to about 140,000 grams per mole, and in some embodiments, from about 80,000 to about 120,000 grams per mole. Likewise, the polymer also typically has a weight average molecular weight ("$M_w$") ranging from about 80,000 to about 200,000 grams per mole, in some embodiments from about 100,000 to about 180,000 grams per mole, and in some embodiments, from about 110,000 to about 160,000 grams per mole. The ratio of the weight average molecular weight to the number average molecular weight ("$M_w/M_n$"), i.e., the "polydispersity index", is also relatively low. For example, the polydispersity index typically ranges from about 1.0 to about 3.0, in some embodiments from about 1.1 to about 2.0, and in some embodiments, from about 1.2 to about 1.8. The weight and number average molecular weights may be determined by methods known to those skilled in the art.

The polylactic acid may also have an apparent viscosity of from about 50 to about 600 Pascal seconds (Pa·s), in some embodiments from about 100 to about 500 Pa·s, and in some embodiments, from about 200 to about 400 Pa·s, as determined at a temperature of 190° C. and a shear rate of 1000 sec$^{-1}$. The melt flow rate of the polylactic acid (on a dry basis) may also range from about 0.1 to about 40 grams per 10 minutes, in some embodiments from about 0.5 to about 20 grams per 10 minutes, and in some embodiments, from about 5 to about 15 grams per 10 minutes, determined at a load of 2160 grams and at 190° C.

Some types of neat polyesters (e.g., polylactic acid) can absorb water from the ambient environment such that it has a moisture content of about 500 to 600 parts per million ("ppm"), or even greater, based on the dry weight of the starting polylactic acid. Moisture content may be determined in a variety of ways as is known in the art, such as in accordance with ASTM D 7191-05, such as described below. Because the presence of water during melt processing can hydrolytically degrade the polyester and reduce its molecular weight, it is sometimes desired to dry the polyester prior to blending. In most embodiments, for example, it is desired that the renewable polyester have a moisture content of about 300 parts per million ("ppm") or less, in some embodiments about 200 ppm or less, in some embodiments from about 1 to about 100 ppm prior to blending with the toughening additive. Drying of the polyester may occur, for instance, at a temperature of from about 50° C. to about 100° C., and in some embodiments, from about 70° C. to about 80° C.

B. Polymeric Toughening Additive

As indicated above, the thermoplastic composition of the present invention also contains a polymeric toughening additive. Due to its polymeric nature, the toughening additive possesses a relatively high molecular weight that can help improve the melt strength and stability of the thermoplastic composition. Although not required, the polymeric toughening additive may be generally immiscible with the renewable polyester. In this manner, the toughening additive can better become dispersed as discrete phase domains within a continuous phase of the renewable polyester. The discrete domains are capable of absorbing energy that arises from an external force, which increases the overall toughness and strength of the resulting material. The domains may have a variety of different shapes, such as elliptical, spherical, cylindrical, etc. In one embodiment, for example, the domains have a substantially elliptical shape. The physical dimension of an individual domain is typically small enough to minimize the propagation of cracks through the polymer material upon the application of an external stress, but large enough to initiate microscopic plastic deformation and allow for shear zones at and around particle inclusions.

While the polymers may be immiscible, the toughening additive may nevertheless be selected to have a solubility parameter that is relatively similar to that of the renewable polyester. This can improve the interfacial compatibility and physical interaction of the boundaries of the discrete and continuous phases, and thus reduces the likelihood that the composition will fracture. In this regard, the ratio of the solubility parameter for the renewable polyester to that of the toughening additive is typically from about 0.5 to about 1.5, and in some embodiments, from about 0.8 to about 1.2. For example, the polymeric toughening additive may have a solubility parameter of from about 15 to about 30 MJoules$^{1/2}$/m$^{3/2}$, and in some embodiments, from about 18 to about 22 MJoules$^{1/2}$/m$^{3/2}$, while polylactic acid may have a solubility parameter of about 20.5 MJoules$^{1/2}$/m$^{3/2}$. The term "solubility parameter" as used herein refers to the "Hildebrand Solubility Parameter", which is the square root of the cohesive energy density and calculated according to the following equation:

$$\delta = \sqrt{((\Delta H_v - RT)/V_m)}$$

where:
 $\Delta Hv$=heat of vaporization
 R=Ideal Gas constant
 T=Temperature
 Vm=Molecular Volume The Hildebrand solubility parameters for many polymers are also available from the Solubility Handbook of Plastics, by Wyeych (2004), which is incorporated herein by reference.

The polymeric toughening additive may also have a certain melt flow rate (or viscosity) to ensure that the discrete domains and resulting voids can be adequately maintained. For example, if the melt flow rate of the toughening additive is too high, it tends to flow and disperse uncontrollably through the continuous phase. This results in lamellar or plate-like domains that are difficult to maintain and also likely to prematurely fracture. Conversely, if the melt flow rate of the toughening additive is too low, it tends to clump together and form very large elliptical domains, which are difficult to disperse during blending. This may cause uneven distribution of the toughening additive through the entirety of the continuous phase. In this regard, the present inventors have discovered that the ratio of the melt flow rate of the toughening additive to the melt flow rate of the renewable polyester is typically from about 0.2 to about 8, in some embodiments from about 0.5 to about 6, and in some embodiments, from about 1 to about 5. The polymeric toughening additive may, for example, have a melt flow rate of from about 0.1 to about 250 grams per 10 minutes, in some embodiments from about 0.5 to about 200 grams per 10 minutes, and in some embodiments, from about 5 to about 150 grams per 10 minutes, determined at a load of 2160 grams and at 190° C.

In addition to the properties noted above, the mechanical characteristics of the polymeric toughening additive may also be selected to achieve the desired increase in toughness. For example, when a blend of the renewable polyester and toughening additive is applied with an external force, shear and/or plastic yielding zones may be initiated at and around the discrete phase domains as a result of stress concentrations that arise from a difference in the elastic modulus of the toughening additive and renewable polyester. Larger stress concentrations promote more intensive localized plastic flow at the domains, which allows them to become significantly elongated when stresses are imparted. These elongated domains allow the composition to exhibit a more pliable and softer behavior than the otherwise rigid polyester resin. To enhance the stress concentrations, the toughening additive is selected to have a relatively low Young's modulus of elasticity in comparison to the renewable polyester. For example, the ratio of the modulus of elasticity of the renewable polyester to that of the toughening additive is typically from about 1 to about 250, in some embodiments from about 2 to about 100, and in some embodiments, from about 2 to about 50. The modulus of elasticity of the toughening additive may, for instance, range from about 2 to about 500 Megapascals (MPa), in some embodiments from about 5 to about 300 MPa, and in some embodiments, from about 10 to about 200 MPa. To the contrary, the modulus of elasticity of polylactic acid is typically from about 800 MPa to about 2000 MPa.

To impart the desired increase in toughness, the polymeric toughening additive may also exhibit an elongation at break (i.e., the percent elongation of the polymer at its yield point) greater than the renewable polyester. For example, the polymeric toughening additive of the present invention may exhibit an elongation at break of about 50% or more, in some embodiments about 100% or more, in some embodiments from about 100% to about 2000%, and in some embodiments, from about 250% to about 1500%.

While a wide variety of polymeric additives may be employed that have the properties identified above, particularly suitable examples of such polymers may include, for instance, polyolefins (e.g., polyethylene, polypropylene, polybutylene, etc.); styrenic copolymers (e.g., styrene-butadiene-styrene, styrene-isoprene-styrene, styrene-ethylene-propylene-styrene, styrene-ethylene-butadiene-styrene, etc.); polytetrafluoroethylenes; polyesters (e.g., recycled polyester, polyethylene terephthalate, etc.); polyvinyl acetates (e.g., poly(ethylene vinyl acetate), polyvinyl chloride acetate, etc.); polyvinyl alcohols (e.g., polyvinyl alcohol, poly(ethylene vinyl alcohol), etc.); polyvinyl butyrals; acrylic resins (e.g., polyacrylate, polymethylacrylate, polymethylmethacrylate, etc.); polyamides (e.g., nylon); polyvinyl chlorides; polyvinylidene chlorides; polystyrenes; polyurethanes; etc. Suitable polyolefins may, for instance, include ethylene polymers (e.g., low density polyethylene ("LDPE"), high density polyethylene ("HDPE"), linear low density polyethylene ("LLDPE"), etc.), propylene homopolymers (e.g., syndiotactic, atactic, isotactic, etc.), propylene copolymers, and so forth.

In one particular embodiment, the polymer is a propylene polymer, such as homopolypropylene or a copolymer of propylene. The propylene polymer may, for instance, be formed from a substantially isotactic polypropylene homopolymer or a copolymer containing equal to or less than about 10 wt. % of other monomer, i.e., at least about 90% by weight propylene. Such homopolymers may have a melting point of from about 160° C. to about 170° C.

In still another embodiment, the polyolefin may be a copolymer of ethylene or propylene with another α-olefin, such as a $C_3$-$C_{20}$ α-olefin or $C_3$-$C_{12}$ α-olefin. Specific examples of suitable α-olefins include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are 1-butene, 1-hexene and 1-octene. The ethylene or propylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

Exemplary olefin copolymers for use in the present invention include ethylene-based copolymers available under the designation EXACT™ from ExxonMobil Chemical Company of Houston, Texas. Other suitable ethylene copolymers are available under the designation ENGAGE™, AFFINITY™, DOWLEX™ (LLDPE) and ATTANE™ (ULDPE) from Dow Chemical Company of Midland, Michigan. Other suitable ethylene polymers are described in U.S. Pat. No. 4,937,299 to Ewen et al.; U.S. Pat. No. 5,218,071 to Tsutsui et al.; U.S. Pat. No. 5,272,236 to Lai, et al.; and U.S. Pat. No. 5,278,272 to Lai, et al., which are incorporated herein in their entirety by reference thereto for all purposes. Suitable propylene copolymers are also commercially available under the designations VISTAMAXX™ from ExxonMobil Chemical Co. of Houston, Texas; FINA™ (e.g., 8573) from Atofina Chemicals of Feluy, Belgium; TAFMER™ available from Mitsui Petrochemical Industries; and VERSIFY™ available from Dow Chemical Co. of Midland, Michigan. Other examples of suitable propylene polymers are described in U.S. Pat. No. 6,500,563 to Datta, et al.; U.S. Pat. No. 5,539,056 to Yang, et al.; and 5,596,052 to Resconi, et al., which are incorporated herein in their entirety by reference thereto for all purposes.

Any of a variety of known techniques may generally be employed to form the olefin copolymers. For instance, olefin polymers may be formed using a free radical or a coordination catalyst (e.g., Ziegler-Natta). Preferably, the olefin polymer is formed from a single-site coordination catalyst, such as a metallocene catalyst. Such a catalyst system produces ethylene copolymers in which the comonomer is randomly distributed within a molecular chain and uniformly distributed across the different molecular weight fractions. Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obijeski et al.; U.S. Pat. No. 5,272,236 to Lai et al.; and U.S. Pat. No. 6,090,325 to Wheat, et al., which are incorporated herein in their entirety by reference thereto for all purposes. Examples of metallocene catalysts include bis(n-butylcyclopentadienyl) titanium dichloride, bis(n-butylcyclopentadienyl) zirconium dichloride, bis(cyclopentadienyl) scandium chloride, bis(indenyl) zirconium dichloride, bis(methylcyclopentadienyl) titanium dichloride, bis(methylcyclopentadienyl) zirconium dichloride, cobaltocene, cyclopentadienyltitanium trichloride, ferrocene, hafnocene dichloride, isopropyl(cyclopentadienyl-1-flourenyl) zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers ($M_w/M_n$) of below 4, controlled short chain branching distribution, and controlled isotacticity.

Regardless of the materials employed, the relative percentage of the polymeric toughening additive in the thermoplastic composition is selected to achieve the desired properties without significantly impacting the renewability of the resulting composition. For example, the toughening additive is typically employed in an amount of from about 1 wt. % to about 30 wt. %, in some embodiments from about 2 wt. % to about 25 wt. %, and in some embodiments, from about 5 wt. % to about 20 wt. % of the thermoplastic composition, based on the weight of the renewable polyesters employed in the composition. The concentration of the toughening additive in the entire thermoplastic composition may likewise constitute from about 0.1 wt. % to about 30 wt. %, in some embodiments from about 0.5 wt. % to about 25 wt. %, and in some embodiments, from about 1 wt. % to about 20 wt. %.

C. Interphase Modifier

An interphase modifier may also be employed in the thermoplastic composition to reduce the degree of friction and connectivity between the toughening additive and renewable polyester, and thus enhance the degree and uniformity of debonding. In this manner, the voids can be distributed in a substantially homogeneous fashion throughout the composition. The modifier is generally in a liquid or semi-solid form at room temperature (e.g., 25° C.) so that it possesses a relatively low viscosity, allowing it to be more readily incorporated into the thermoplastic composition and to easily migrate to the polymer surfaces. In this regard, the kinematic viscosity of the interphase modifier is typically from about 0.7 to about 200 centistokes ("cs"), in some embodiments from about 1 to about 100 cs, and in some embodiments, from about 1.5 to about 80 cs, determined at 40° C. In addition, the interphase modifier is also typically hydrophobic so that it has an affinity for the polymer toughening additive, resulting in a change in the interfacial tension between the renewable polyester and the toughening additive. By reducing physical forces at the interfaces between the polyester and the toughening additive, it is believed that the low viscosity, hydrophobic nature of the modifier can help facilitate debonding from the polyester matrix. As used herein, the term "hydrophobic" typically refers to a material having a contact angle of water in air of about 40° or more, and in some cases, about 60° or more. In contrast, the term "hydrophilic" typically refers to a material having a contact angle of water in air of less than about 40°. One suitable test for measuring the contact angle is ASTM D5725-99 (2008).

Suitable hydrophobic, low viscosity interphase modifiers may include, for instance, silicones, silicone-polyether copolymers, aliphatic polyesters, aromatic polyesters, alkylene glycols (e.g., ethylene glycol, diethylene glycol, triethylene glycol, tetraethylene glycol, propylene glycol, polyethylene glycol, polypropylene glycol, polybutylene glycol, etc.), alkane diols (e.g., 1,3-propanediol, 2,2-dimethyl-1,3-propanediol, 1,3-butanediol, 1,4-butanediol, 1,5-pentanediol, 1,6-hexanediol, 2,2,4-trimethyl-1,6 hexanediol, 1,3-cyclohexanedimethanol, 1,4-cyclohexanedimethanol, 2,2,4,4-tetramethyl-1,3-cyclobutanediol, etc.), amine oxides (e.g., octyldimethylamine oxide), fatty acid esters, etc. One particularly suitable interphase modifier is polyether polyol, such as commercially available under the trade name PLURIOL® WI from BASF Corp. Another suitable modifier is a partially renewable ester, such as commercially available under the trade name HALLGREEN® IM from Hallstar.

Although the actual amount may vary, the interphase modifier is typically employed in an amount of from about 0.1 wt. % to about 20 wt. %, in some embodiments from about 0.5 wt. % to about 15 wt. %, and in some embodiments, from about 1 wt. % to about 10 wt. % of the thermoplastic composition, based on the weight of the renewable polyesters employed in the composition. The concentration of the interphase modifier in the entire thermoplastic composition may likewise constitute from about 0.05 wt. % to about 20 wt. %, in some embodiments from about 0.1 wt. % to about 15 wt. %, and in some embodiments, from about 0.5 wt. % to about 10 wt. %.

When employed in the amounts noted above, the interphase modifier has a character that enables it to readily migrate to the interfacial surface of the polymers and facilitate debonding without disrupting the overall melt properties of the thermoplastic composition. For example, the interphase modifier does not typically have a plasticizing effect on the polymer by reducing its glass transition temperature. Quite to the contrary, the present inventors have discovered that the glass transition temperature of the thermoplastic composition may be substantially the same as the initial renewable polyester. In this regard, the ratio of the glass temperature of the composition to that of the polyester is typically from about 0.7 to about 1.3, in some embodiments from about 0.8 to about 1.2, and in some embodiments, from about 0.9 to about 1.1. The thermoplastic composition may, for example, have a glass transition temperature of from about 35° C. to about 80° C., in some embodiments from about 40° C. to about 80° C., and in some embodiments, from about 50° C. to about 65° C. The melt flow rate of the thermoplastic composition may also be similar to that of the renewable polyester. For example, the melt flow rate of the composition (on a dry basis) may be from about 0.1 to about 70 grams per 10 minutes, in some embodiments from about 0.5 to about 50 grams per 10 minutes, and in some embodiments, from about 5 to about 25 grams per 10 minutes, determined at a load of 2160 grams and at a temperature of 190° C.

D. Compatibilizer

As indicated above, the polymeric toughening additive is generally selected so that it has a solubility parameter relatively close to that of the renewable polyester. Among other things, this can enhance the compatibility of the phases and improve the overall distribution of the discrete domains within the continuous phase. Nevertheless, in certain embodiments, a compatibilizer may optionally be employed to further enhance the compatibility between the renewable polyester and the polymeric toughening additive. This may be particularly desirable when the polymeric toughening additive possesses a polar moiety, such as polyurethanes, acrylic resins, etc. When employed, the compatibilizers typically constitute from about 0.5 wt. % to about 20 wt. %, in some embodiments from about 1 wt. % to about 15 wt. %, and in some embodiments, from about 1.5 wt. % to about 10 wt. % of the thermoplastic composition. One example of a suitable compatibilizer is a functionalized polyolefin. The polar component may, for example, be provided by one or more functional groups and the non-polar component may be provided by an olefin. The olefin component of the compatibilizer may generally be formed from any linear or branched α-olefin monomer, oligomer, or polymer (including copolymers) derived from an olefin monomer, such as described above.

The functional group of the compatibilizer may be any group that provides a polar segment to the molecule. Particularly suitable functional groups are maleic anhydride, maleic acid, fumaric acid, maleimide, maleic acid hydrazide, a reaction product of maleic anhydride and diamine, methylnadic anhydride, dichloromaleic anhydride, maleic acid amide, etc. Maleic anhydride modified polyolefins are particularly suitable for use in the present invention. Such modified polyolefins are typically formed by grafting maleic anhydride onto a polymeric backbone material. Such maleated polyolefins are available from E. I. du Pont de Nemours and Company under the designation Fusabond®, such as the P Series (chemically modified polypropylene), E Series (chemically modified polyethylene), C Series (chemically modified ethylene vinyl acetate), A Series (chemically modified ethylene acrylate copolymers or terpolymers), or N Series (chemically modified ethylene-propylene, ethylene-propylene diene monomer ("EPDM") or ethylene-octene). Alternatively, maleated polyolefins are also available from Chemtura Corp. under the designation Polybond® and Eastman Chemical Company under the designation Eastman G series.

In certain embodiments, the compatibilizer may also be reactive. One example of such a reactive compatibilizer is a polyepoxide modifier that contains, on average, at least two oxirane rings per molecule. Without intending to be limited by theory, it is believed that such polyepoxide molecules can induce reaction of the renewable polyester under certain conditions, thereby improving its melt strength without significantly reducing glass transition temperature. The reaction may involve chain extension, side chain branching, grafting, copolymer formation, etc. Chain extension, for instance, may occur through a variety of different reaction pathways. For instance, the modifier may enable a nucleophilic ring-opening reaction via a carboxyl terminal group of the renewable polyester (esterification) or via a hydroxyl group (etherification). Oxazoline side reactions may likewise occur to form esteramide moieties. Through such reactions, the molecular weight of the renewable polyester may be increased to counteract the degradation often observed during melt processing. While it is desirable to induce a reaction with the renewable polyester as described above, the present inventors have discovered that too much of a reaction can lead to crosslinking between polyester backbones. If such crosslinking is allowed to proceed to a significant extent, the resulting polymer blend can become brittle and difficult to form into fibers with the desired strength and elongation properties.

In this regard, the present inventors have discovered that polyepoxide modifiers having a relatively low epoxy functionality are particularly effective, which may be quantified by its "epoxy equivalent weight." The epoxy equivalent weight reflects the amount of resin that contains one molecule of an epoxy group, and it may be calculated by dividing the number average molecular weight of the modifier by the number of epoxy groups in the molecule. The polyepoxide modifier of the present invention typically has a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7. The polyepoxide modifier may contain less than 50, in some embodiments from 5 to 45, and in some embodiments, from 15 to 40 epoxy groups. In turn, the epoxy equivalent weight may be less than about 15,000 grams per mole, in some embodiments from about 200 to about 10,000 grams per mole, and in some embodiments, from about 500 to about 7,000 grams per mole.

The polyepoxide may be a linear or branched, homopolymer or copolymer (e.g., random, graft, block, etc.) containing terminal epoxy groups, skeletal oxirane units, and/or pendent epoxy groups. The monomers employed to form such polyepoxides may vary. In one particular embodiment, for example, the polyepoxide modifier contains at least one epoxy-functional (meth)acrylic monomeric component. As used herein, the term "(meth)acrylic" includes acrylic and methacrylic monomers, as well as salts or esters thereof, such as acrylate and methacrylate monomers. For example, suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

The polyepoxide typically has a relatively high molecular weight, as indicated above, so that it can not only result in chain extension of the renewable polyester, but also help to achieve the desired blend morphology. The resulting melt flow rate of the polymer is thus typically within a range of from about 10 to about 200 grams per 10 minutes, in some embodiments from about 40 to about 150 grams per 10 minutes, and in some embodiments, from about 60 to about 120 grams per 10 minutes, determined at a load of 2160 grams and at a temperature of 190° C.

If desired, additional monomers may also be employed in the polyepoxide to help achieve the desired molecular weight. Such monomers may vary and include, for example, ester monomers, (meth)acrylic monomers, olefin monomers, amide monomers, etc. In one particular embodiment, for example, the polyepoxide modifier includes at least one linear or branched α-olefin monomer, such as those having from 2 to 20 carbon atoms and preferably from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are ethylene and propylene.

Another suitable monomer may include a (meth)acrylic monomer that is not epoxy-functional. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof.

In one particularly desirable embodiment of the present invention, the polyepoxide modifier is a terpolymer formed from an epoxy-functional (meth)acrylic monomeric component, α-olefin monomeric component, and non-epoxy functional (meth)acrylic monomeric component. For example, the polyepoxide modifier may be poly(ethylene-co-methylacrylate-co-glycidyl methacrylate), which has the following structure:

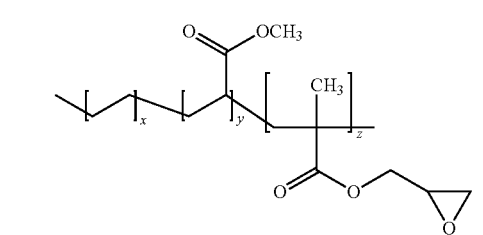

wherein, x, y, and z are 1 or greater.

The epoxy functional monomer may be formed into a polymer using a variety of known techniques. For example, a monomer containing polar functional groups may be grafted onto a polymer backbone to form a graft copolymer. Such grafting techniques are well known in the art and described, for instance, in U.S. Pat. No. 5,179,164, which is incorporated herein in its entirety by reference thereto for all purposes. In other embodiments, a monomer containing epoxy functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

The relative portion of the monomeric component(s) may be selected to achieve a balance between epoxy-reactivity and melt flow rate. More particularly, high epoxy monomer contents can result in good reactivity with the renewable polyester, but too high of a content may reduce the melt flow rate to such an extent that the polyepoxide modifier adversely impacts the melt strength of the polymer blend. Thus, in most embodiments, the epoxy-functional (meth)acrylic monomer(s) constitute from about 1 wt. % to about 25 wt. %, in some embodiments from about 2 wt. % to about 20 wt. %, and in some embodiments, from about 4 wt. % to about 15 wt. % of the copolymer. The α-olefin monomer(s) may likewise constitute from about 55 wt. % to about 95 wt. %, in some embodiments from about 60 wt. % to about 90 wt. %, and in some embodiments, from about 65 wt. % to about 85 wt. % of the copolymer. When employed, other monomeric components (e.g., non-epoxy functional (meth)acrylic monomers) may constitute from about 5 wt. % to about 35 wt. %, in some embodiments from about 8 wt. % to about 30 wt. %, and in some embodiments, from about 10 wt. % to about 25 wt. % of the copolymer. One specific example of a suitable polyepoxide modifier that may be used in the present invention is commercially available from Arkema under the name LOTADER® AX8950 or AX8900. LOTADER® AX8950, for instance, has a melt flow rate of 70 to 100 g/10 min and has a glycidyl methacrylate monomer content of 7 wt. % to 11 wt. %, a methyl acrylate monomer content of 13 wt. % to 17 wt. %, and an ethylene monomer content of 72 wt. % to 80 wt. %.

In addition to controlling the type and relative content of the monomers used to form the polyepoxide modifier, the overall weight percentage may also be controlled to achieve the desired benefits. For example, if the modification level is too low, the desired increase in melt strength and mechanical properties may not be achieved. The present inventors have also discovered, however, that if the modification level is too high, fiber formation may be restricted due to strong molecular interactions (e.g., crosslinking) and physical network formation by the epoxy functional groups. Thus, the polyepoxide modifier is typically employed in an amount of from about 0.05 wt. % to about 10 wt. %, in some embodiments from about 0.1 wt. % to about 8 wt. %, in some embodiments from about 0.5 wt. % to about 5 wt. %, and in some embodiments, from about 1 wt. % to about 3 wt. %, based on the weight of the renewable polyesters employed in the composition. The polyepoxide modifier may also constitute from about 0.05 wt. % to about 10 wt. %, in some embodiments from about 0.05 wt. % to about 8 wt. %, in some embodiments from about 0.1 wt. % to about 5 wt. %, and in some embodiments, from about 0.5 wt. % to about 3 wt. %, based on the total weight of the composition.

In addition to polyepoxides, other reactive compatibilizers may also be employed in the present invention, such as oxazoline-functionalized polymers, cyanide-functionalized polymers, etc. When employed, such reactive compatibilizers may be employed within the concentrations noted above for the polyepoxide modifier. In one particular embodiment, an oxazoline-grafted polyolefin may be employed that is a polyolefin grafted with an oxazoline ring-containing monomer. The oxazoline may include a 2-oxazoline, such as 2-vinyl-2-oxazoline (e.g., 2-isopropenyl-2-oxazoline), 2-fatty-alkyl-2-oxazoline (e.g., obtainable from the ethanolamide of oleic acid, linoleic acid, palmitoleic acid, gadoleic acid, erucic acid and/or arachidonic acid) and combinations thereof. In another embodiment, the oxazoline may be selected from ricinoloxazoline maleinate, undecyl-2-oxazoline, soya-2-oxazoline, ricinus-2-oxazoline and combinations thereof, for example. In yet another embodiment, the oxazoline is selected from 2-isopropenyl-2-oxazoline, 2-isopropenyl-4,4-dimethyl-2-oxazoline and combinations thereof.

E. Other Components

One beneficial aspect of the present invention is that good mechanical properties may be provided without the need for various conventional additives, such as blowing agents (e.g., chlorofluorocarbons, hydrochlorofluorocarbons, hydrocarbons, carbon dioxide, etc.) and plasticizers (e.g., solid or semi-solid polyethylene glycol). In fact, the thermoplastic composition may be substantially free of blowing agents and/or plasticizers. For example, blowing agents and/or plasticizers may be present in an amount of no more than about 1 wt. %, in some embodiments no more than about 0.5 wt. %, and in some embodiments, from about 0.001 wt. % to about 0.2 wt. % of the thermoplastic composition. Further, due to its stress whitening properties, as described in more detail below, the resulting composition may achieve an opaque color (e.g., white) without the need for conventional pigments, such as titanium dioxide. In certain embodiments, for example, pigments may be present in an amount of no more than about 1 wt. %, in some embodiments no more than about 0.5 wt. %, and in some embodiments, from about 0.001 wt. % to about 0.2 wt. % of the thermoplastic composition. Of course, a wide variety of ingredients may be utilized in the composition for a variety of different reasons. For instance, materials that may be used include, without limitation, catalysts, antioxidants, stabilizers, surfactants, waxes, solid solvents, fillers, nucleating agents (e.g., calcium carbonate, etc.), particulates, and other materials added to enhance the processability of the thermoplastic composition.

II. Blending

The components of the thermoplastic composition may be blended together using any of a variety of known techniques. In one embodiment, for example, the components may be supplied separately or in combination. For instance, the components may first be dry mixed together to form an essentially homogeneous dry mixture, and they may likewise be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. Particularly suitable melt processing devices may be a co-rotating, twin-screw extruder (e.g., ZSK-30 extruder available from Werner & Pfleiderer Corporation of Ramsey, New Jersey or a Thermo Prism™ USALAB 16 extruder available from Thermo Electron Corp., Stone, England). Such extruders may include feeding and venting ports and provide high intensity distributive and dispersive mixing. For example, the components may be fed to the same or different feeding ports of the twin-screw extruder and melt blended to form a substantially homogeneous melted mixture. If desired, other additives may also be injected into the polymer melt and/or separately fed into the extruder at a different point along its length.

Regardless of the particular processing technique chosen, the resulting melt blended material typically contains domains of the toughening additive with an axial dimension of a domain (e.g., length) of from about 0.05 µm to about 30 µm, in some embodiments from about 0.1 µm to about 25 µm, in some embodiments from about 0.5 µm to about 20 µm, and in some embodiments from about 1 µm to about 10 µm. When employed the polyepoxide modifier may also be in the form of discrete domains distributed throughout the continuous polyester matrix. These "secondary" domains may have a variety of different shapes, such as elliptical, spherical, cylindrical, etc. Regardless of the shape, however, the size of an individual secondary domain, after blending, is small to provide an increased surface area for reaction with the renewable polyester. For example, the size of a secondary domain (e.g., length) typically ranges from about 10 to about 1000 nanometers, in some embodiments from about 20 to about 800 nanometers, in some embodiments from about 40 to about 600 nanometers, and in some embodiments from about 50 to about 400 nanometers. As noted above, the toughening additive also forms discrete domains within the polyester matrix, which are considered in the "primary" domains of the composition. Of course, it should be also understood that domains may be formed by a combination of the polyepoxide, toughening additive, and/or other components of the blend.

The degree of shear/pressure and heat may be controlled to ensure sufficient dispersion, but not so high as to adversely reduce the size of the discrete domains so that they are incapable of achieving the desired toughness and elongation. For example, blending typically occurs at a temperature of from about 180° C. to about 260° C., in some embodiments from about 185° C. to about 250° C., and in some embodiments, from about 190° C. to about 240° C. Likewise, the apparent shear rate during melt processing may range from about 10 seconds-1 to about 3000 seconds-1, in some embodiments from about 50 seconds-1 to about 2000 seconds-1, and in some embodiments, from about 100 seconds-1 to about 1200 seconds-1. The apparent shear rate is equal to $4Q/\pi R^3$, where Q is the volumetric flow rate ("$m^3/s$") of the polymer melt and R is the radius ("m") of the capillary (e.g., extruder die) through which the melted polymer flows. Of course, other variables, such as the residence time during melt processing, which is inversely proportional to throughput rate, may also be controlled to achieve the desired degree of homogeneity.

To achieve the desired shear conditions (e.g., rate, residence time, shear rate, melt processing temperature, etc.), the speed of the extruder screw(s) may be selected with a certain range. Generally, an increase in product temperature is observed with increasing screw speed due to the additional mechanical energy input into the system. For example, the screw speed may range from about 50 to about 300 revolutions per minute ("rpm"), in some embodiments from about 70 to about 500 rpm, and in some embodiments, from about 100 to about 300 rpm. This may result in a temperature that is sufficient high to disperse the toughening additive without adversely impacting the size of the resulting domains. The melt shear rate, and in turn the degree to which the polymers are dispersed, may also be increased through the use of one or more distributive and/or dispersive mixing elements within the mixing section of the extruder. Suitable distributive mixers for single screw extruders may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin (VIP) mixers.

III. Fiber Formation

Fibers formed from the blended thermoplastic composition may generally have any desired configuration, including monocomponent and multicomponent (e.g., sheath-core configuration, side-by-side configuration, segmented pie configuration, island-in-the-sea configuration, and so forth). In some embodiments, the fibers may contain one or more additional polymers as a component (e.g., bicomponent) or constituent (e.g., biconstituent) to further enhance strength and other mechanical properties. For instance, the thermoplastic composition may form a sheath component of a sheath/core bicomponent fiber, while an additional polymer may form the core component, or vice versa. The additional polymer may be a thermoplastic polymer that is not generally considered renewable, such as polyolefins, e.g., polyethylene, polypropylene, polybutylene, and so forth; polytetrafluoroethylene; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; and polyurethanes. More desirably, however, the additional polymer is renewable.

Any of a variety of processes may be used to form fibers in accordance with the present invention. For example, the thermoplastic composition described above may be extruded through a spinneret and quenched. Referring to FIG. 1, for example, one embodiment of a method for forming fibers is shown in more detail. In this particular embodiment, the thermoplastic composition of the present invention may be fed into an extruder 12 from a hopper 14. The blend may be provided to the hopper 14 using any conventional technique. Regardless, it is generally desired that the blend have a low moisture content to minimize hydrolytic degradation of the renewable polyester, such as about 300 parts per million ("ppm") or less, in some embodiments about 200 ppm or less, in some embodiments from about 1 to about 100 ppm. Such moisture contents may be achieved by drying, such as at a temperature of from about 50° C. to about 100° C., and in some embodiments, from about 70° C. to about 80° C.

The extruder 12 is heated to a temperature sufficient to extrude the melted polymer. The extruded composition is then passed through a polymer conduit 16 to a spinneret 18. For example, the spinneret 18 may include a housing containing a spin pack having a plurality of plates stacked one on top of each other and having a pattern of openings arranged to create flow paths for directing polymer components. The spinneret 18 also has openings arranged in one or more rows. The openings form a downwardly extruding curtain of filaments when the polymers are extruded therethrough. The process 10 also employs a quench blower 20 positioned adjacent the curtain of fibers extending from the spinneret 18. Air from the quench air blower 20 quenches the fibers extending from the spinneret 18. The quench air may be directed from one side of the fiber curtain as shown in FIG. 1 or both sides of the fiber curtain.

To form a fiber with the desired length, the quenched fibers are generally melt drawn, such as using a fiber draw unit 22 as shown in FIG. 1. Fiber draw units or aspirators for use in melt spinning polymers are well-known in the art. Suitable fiber draw units for use in the process of the present invention include a linear fiber aspirator of the type shown in U.S. Pat. Nos. 3,802,817 and 3,423,255. The fiber draw unit 22 generally includes an elongated vertical passage through which the fibers are drawn by aspirating air entering from the sides of the passage and flowing downwardly through the passage. A heater or blower 24 supplies aspirating air to the fiber draw unit 22. The aspirating air draws the fibers and ambient air through the fiber draw unit 22. The flow of gas causes the fibers to draw or attenuate which increases the molecular orientation or crystallinity of the polymers forming the fibers. When employing a fiber draw unit, the "draw down" ratio may be selected to help achieve the desired fiber length. The "drawn down" ratio is the linear speed of the fibers after drawing (e.g., linear speed of the godet roll 42 or a foraminous surface (not shown) divided by the linear speed of the fibers after extrusion). For example, the draw down ratio during melt drawing may be calculated as follows:

$$\text{Draw Down Ratio}=A/B$$

wherein,

A is the linear speed of the fiber after melt drawing (e.g., godet speed) and is directly measured; and B is the linear speed of the extruded fiber and can be calculated as follows:

$$\text{Extruder linear fiber speed}=C/(25*\pi*D*E^2)$$

wherein,

C is the throughput through a single hole (grams per minute);

D is the melt density of the polymer (grams per cubic centimeter); and

E is the diameter of the orifice (in centimeters) through which the fiber is extruded. In certain embodiments, the draw down ratio may be from about 20:1 to about 4000:1, in some embodiments from about 25:1 to about 2000:1, and in some embodiments, from about 50:1 to about 1000:1 and in some embodiments from about 75:1 to about 800:1.

Once formed, the fibers may be deposited through the outlet opening of the fiber draw unit 22 and onto a godet roll 42. If desired, the fibers collected on the godet roll 42 may optionally be subjected to additional in line processing and/or converting steps (not shown) as will be understood by those skilled in the art. For example, fibers may be collected and thereafter crimped, texturized, and/or and cut to an average fiber length in the range of from about 3 to about 80 millimeters, in some embodiments from about 4 to about 65 millimeters, and in some embodiments, from about 5 to about 50 millimeters. The staple fibers may then be incorporated into a nonwoven web as is known in the art, such as bonded carded webs, through-air bonded webs, etc. The fibers may also be deposited onto a foraminous surface to form a nonwoven web, such as described in more detail below.

Regardless of the particular manner in which they are formed, the resulting fibers are thereafter drawn at a temperature below the glass transition temperature of the renewable polyester ("cold drawn") to form the desired voided network. Cold drawing may occur in the longitudinal direction (e.g., machine direction), transverse direction (e.g., cross-machine direction), or a combination thereof. The degree of drawing is generally selected in the present invention to ensure that the desired voided network is achieved, but not to such an extent that the mechanical properties of the resulting fibers are adversely impacted. In this regard, fibers are typically drawn (e.g., in the machine direction) to a "stretch ratio" of from about 1.1 to about 3.5, in some embodiments from about 1.2 to about 3.0, and in some embodiments, from about 1.5 to about 2.5. The "stretch ratio" may be determined by dividing the length of a drawn fiber by its length before drawing. The draw rate may also vary to help achieve the desired properties, such as within the range of from about 5% to about 1500% per minute of deformation, in some embodiments from about 10% to about 1000% per minute of deformation, and in some embodiments, from about 100% to about 850% per minute of deformation. The fibers are generally kept at a temperature below the glass temperature of the renewable polyester during drawing. Among other things, this helps to ensure that the polyester chains are not altered to such an extent that the voided network becomes unstable. Typically, the fibers are drawn at a temperature that is at least about 10° C., in some embodiments at least about 20° C., and in some embodiments, at least about 30° C. below then glass transition temperature. For example, the fibers may be drawn at a temperature of from about 0° C. to about 50° C., in some embodiments from about 15° C. to about 40° C., and in some embodiments, from about 20° C. to about 30° C. If desired, the fibers may be drawn without the application of external heat.

Drawing of the fibers may occur in one or multiple stages. In one embodiment, for example, drawing is completed in-line without having to remove it for separate processing. In other cases, however, the fibers may be drawn to a certain extent in-line, and then removed from the fiber forming machinery and subjected to an additional drawing step. Regardless, various drawing techniques may be employed, such as aspiration (e.g., fiber draw units), tensile frame drawing, biaxial drawing, multi-axial drawing, profile drawing, vacuum drawing, etc.

Cold drawing in the manner described above generally results in the formation of voids that have an axial dimension in the direction of stretching (e.g., longitudinal or machine direction) that is relatively small. For example, in one embodiment, the axial dimension of the voids may be about 5 micrometers or less, in some embodiments about 2 micrometers or less, and in some embodiments, from about 25 nanometers to about 1 micrometer. In certain cases, the voids may be "micro-voids" in the sense that at least one dimension of such voids has a size of about 1 micrometer or more. For example, such micro-voids may have a dimension in a direction orthogonal to the axial dimension (i.e., transverse or cross-machine direction) that is about 1 micrometer or more, in some embodiments about 1.5 micrometers or more, and in some embodiments, from about 2 micrometers to about 5 micrometers. This may result in an aspect ratio for the micro-voids (the ratio of the axial dimension to the dimension orthogonal to the axial dimension) of from about 0.1 to about 1, in some embodiments from about 0.2 to about 0.9, and in some embodiments, from about 0.3 to about 0.8. Likewise, "nano-voids" may also be present, either alone or in conjunction with the micro-voids. Each dimension of the nano-voids is typically less than about 1 micrometer, and in some embodiments, from about 25 to about 500 nanometers.

In addition to forming a voided network as described above, drawing can also significantly increase the axial dimension of the primary domains so that they have a generally linear, elongated shape. For example, the elongated domains may have an axial dimension that is about 10% or more, in some embodiments from about 20% to about 500%, and in some embodiments, from about 50% to about 250% greater than the axial dimension of the domains prior to drawing. The axial dimension after drawing may, for instance, range from about 1 μm to about 400 μm, in some embodiments from about 5 μm to about 200 μm, and in some embodiments from about 10 μm to about 150 μm. The domains may also be relatively thin and thus have a small dimension in a direction orthogonal to the axial dimension (i.e., cross-sectional dimension). For instance, the cross-sectional dimension may be from about 0.02 to about 75 micrometers, in some embodiments from about 0.1 to about 40 micrometers, and in some embodiments, from 0.4 to about 20 micrometers in length. This may result in an aspect ratio for the domains (the ratio of the axial dimension to a dimension orthogonal to the axial dimension) of from about 2 to about 150, in some embodiments from about 3 to about 100, and in some embodiments, from about 4 to about 50.

As a result of the voided and elongated domain structure obtained from cold drawing, the present inventors have also discovered that the resulting composition can expand uniformly in volume when drawn in longitudinal direction, which is reflected by a low "Poisson coefficient", as determined according to the following equation:

$$\text{Poisson coefficient} = -E_{transverse}/E_{longitudinal}$$

where $E_{transverse}$ is the transverse deformation of the material and $E_{longitudinal}$ is the longitudinal deformation of the material. More particularly, the Poisson coefficient of the material can be approximately 0 or even negative. For example, the Poisson coefficient may be about 0.1 or less, in some embodiments about 0.08 or less, and in some embodiments, from about −0.1 to about 0.04. When the Poisson coefficient is zero, there is no contraction in transverse direction when the material is expanded in the longitudinal direction. When the Poisson coefficient is negative, the transverse or lateral dimensions of the material are also expanding when the material is drawn in the longitudinal direction. Materials having a negative Poisson coefficient can thus exhibit an increase in width when stretched in the longitudinal direction, which can result in increased energy absorption in the cross direction.

Figure 2:
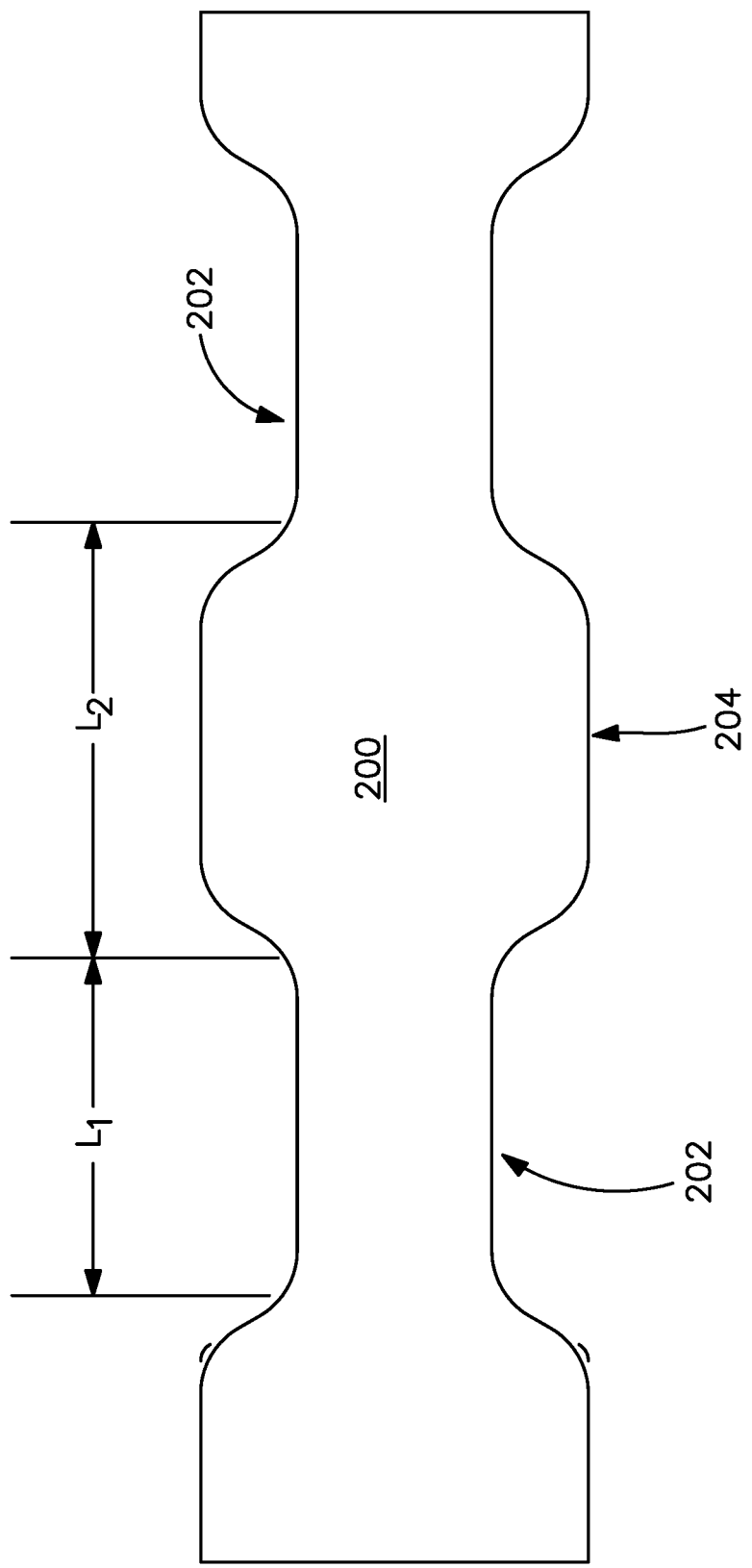
FIG. 2 is a schematic illustration of one embodiment of a fiber that may be formed in accordance with the present invention.

Cold drawing may also create one or more localized necked regions along the longitudinal axis of the fiber, which are spaced between unnecked regions. These necked regions may contain a fewer number of voids than the unnecked regions, which allows the fiber to retain a high degree of strength even though the overall low density is low and the void volume is high. The necked fibers may also possess a non-uniform, cross-sectional diameter along its longitudinal axis, which can provide a variety of different benefits, such as increased surface area, etc. The number of necked regions may generally vary and may be controlled based on the selected stretch ratio. Typically, however, the number of necked regions may range from about 1 to about 400 necks per centimeter, in some embodiments from about 2 to about 200 necks per centimeter, and in some embodiments, from about 5 to about 50 necks per centimeter. The number of necked regions may be determined from the following equation:

$$N=(1-L_2)/(L_1+L_2)$$

where, N is the number of necked regions, $L_1$ is the average length of a necked region, and $L_2$ is the average length of an unnecked region (includes transition from necked to unnecked region). Referring to FIG. 2, for example, an example of a fiber 200 is shown that contains necked regions 202 spaced between unnecked regions 204, wherein the length of the necked regions 202 is shown as length "$L_1$," and the length of the unnecked regions 204 is shown as length "$L_2$."

Even at the very low densities achieved by the present invention, the resulting fibers are not as brittle as the neat polymer and thus can deform upon the application of strain, rather than fracture. The fibers may thus continue to function as a load bearing member even after the fiber has exhibited substantial elongation. In this regard, the fibers of the present invention are capable of exhibiting improved "peak elongation properties, i.e., the percent elongation of the fiber at its peak load. For example, the fibers of the present invention may exhibit a peak elongation of about 50% or more, in some embodiments about 100% or more, in some embodiments from about 200% to about 1500%, and in some embodiments, from about 400% to about 800%, such as determined in accordance with ASTM D638-10 at 23° C. Such elongations may be achieved for fibers having a wide variety of average diameters, such as those ranging from about 0.1 to about 50 micrometers, in some embodiments from about 1 to about 40 micrometers, in some embodiments from about 2 to about 25 micrometers, and in some embodiments, from about 5 to about 15 micrometers.

While possessing the ability to extend under strain, the fibers of the present invention can also remain relatively strong. For example, the fibers may exhibit a peak tensile stress of from about 25 to about 200 Megapascals ("MPa"), in some embodiments from about 50 to about 150 MPa, and in some embodiments, from about 60 to about 150 MPa, such as determined in accordance with ASTM D638-10 at 23° C. Another parameter that is indicative of the relative strength of the fibers of the present invention is "tenacity", which indicates the tensile strength of a fiber expressed as force per unit linear density. For example, the fibers of the present invention may have a tenacity of from about 0.75 to about 6.0 grams-force ("gf") per denier, in some embodiments from about 1.0 to about 4.5 gr per denier, and in some embodiments, from about 1.5 to about 4.0 gr per denier. The denier of the fibers may vary depending on the desired application. Typically, the fibers are formed to have a denier per filament (i.e., the unit of linear density equal to the mass in grams per 9000 meters of fiber) of less than about 6, in some embodiments less than about 3, and in some embodiments, from about 0.5 to about 3.

If desired, the fibers of the present invention may be subjected to one or more additional processing steps, before and/or after cold drawing. Examples of such processes include, for instance, groove roll stretching, embossing, coating, etc. The fibers may also be surface treated using any of a variety of known techniques to improve its properties. For example, high energy beams (e.g., plasma, x-rays, e-beam, etc.) may be used to remove or reduce any skin layers that form on the fibers, to change the surface polarity, porosity, topography, etc. If desired, such surface treatment may alternatively be used before and/or after cold drawing of the fibers.

The fibers may also be incorporated into a fabric, such as a woven fabric, knit fabric, nonwoven web, etc. For example, the fibers may be formed into a nonwoven web structure by randomly depositing the fibers onto a forming surface (optionally with the aid of a vacuum) and then bonding the resulting web using any known technique. The nonwoven web may be formed before or after the fibers are drawn. In certain embodiments, for instance, it may be desired to form a nonwoven web from a plurality of fibers, and thereafter drawn the fibers by stretching the nonwoven web to the extent desired to form the voided network. In an alternative embodiment, an endless forming surface may simply be positioned below a fiber aspiration unit that draws the fibers to the desired extent before the web is formed.

Once formed, the nonwoven web may then be bonded using any conventional technique, such as with an adhesive or autogenously (e.g., fusion and/or self-adhesion of the fibers without an applied external adhesive). Autogenous bonding, for instance, may be achieved through contact of the fibers while they are semi-molten or tacky, or simply by blending a tackifying resin and/or solvent with the polymer used to form the fibers. Suitable autogenous bonding techniques may include ultrasonic bonding, thermal bonding, through-air bonding, calendar bonding, and so forth. For example, the web may be further bonded or embossed with a pattern by a thermo-mechanical process in which the web is passed between a heated smooth anvil roll and a heated pattern roll. The pattern roll may have any raised pattern which provides the desired web properties or appearance. Desirably, the pattern roll defines a raised pattern which defines a plurality of bond locations which define a bond area between about 2% and 30% of the total area of the roll. Exemplary bond patterns include, for instance, those described in U.S. Pat. No. 3,855,046 to Hansen et al., U.S. Pat. No. 5,620,779 to Levy et al., U.S. Pat. No. 5,962,112 to Haynes et al., U.S. Pat. No. 6,093,665 to Sayovitz et al., as well as U.S. Design U.S. Pat. No. 428,267 to Romano et al.; 390,708 to Brown; 418,305 to Zander, et al.; 384,508 to Zander, et al.; 384,819 to Zander, et al.; 358,035 to Zander, et al.; and 315,990 to Blenke, et al. The pressure between the rolls may be from about 5 to about 2000 pounds per lineal inch. The pressure between the rolls and the temperature of the rolls is balanced to obtain desired web properties or appearance while maintaining cloth like properties. As is well known to those skilled in the art, the temperature and pressure required may vary depending upon many factors including but not limited to, pattern bond area, polymer properties, fiber properties and nonwoven properties.

In addition to spunbond webs, a variety of other nonwoven webs may also be formed from the thermoplastic composition in accordance with the present invention, such as meltblown webs, bonded carded webs, wet-laid webs, airlaid webs, coform webs, hydraulically entangled webs, etc. For example, the thermoplastic composition may be extruded through a plurality of fine die capillaries into a converging high velocity gas (e.g., air) streams that attenuate the fibers to reduce their diameter. Thereafter, the meltblown fibers are carried by the high velocity gas stream and are deposited on a collecting surface to form a web of randomly dispersed meltblown fibers. Alternatively, the polymer may be formed into a carded web by placing bales of fibers formed from the thermoplastic composition into a picker that separates the fibers. Next, the fibers are sent through a combing or carding unit that further breaks apart and aligns the fibers in the machine direction so as to form a machine direction-oriented fibrous nonwoven web. Once formed, the nonwoven web is typically stabilized by one or more known bonding techniques.

If desired, the nonwoven web may also be a composite that contains a combination of the thermoplastic composition fibers and other types of fibers (e.g., staple fibers, filaments, etc.). For example, additional synthetic fibers may be utilized, such as those formed from polyolefins, e.g., polyethylene, polypropylene, polybutylene, and so forth; polytetrafluoroethylene; polyesters, e.g., polyethylene terephthalate and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; polyurethanes; polylactic acid; etc. If desired, renewable polymers may also be employed. Some examples of known synthetic fibers include sheath-core bicomponent fibers available from KoSa Inc. of Charlotte, North Carolina under the designations T-255 and T-256, both of which use a polyolefin sheath, or T-254, which has a low melt co-polyester sheath. Still other known bicomponent fibers that may be used include those available from the Chisso Corporation of Moriyama, Japan or Fibervisions LLC of Wilmington, Delaware. Polylactic acid staple fibers may also be employed, such as those commercially available from Far Eastern Textile, Ltd. of Taiwan.

The composite may also contain pulp fibers, such as high-average fiber length pulp, low-average fiber length pulp, or mixtures thereof. One example of suitable high-average length fluff pulp fibers includes softwood kraft pulp fibers. Softwood kraft pulp fibers are derived from coniferous trees and include pulp fibers such as, but not limited to, northern, western, and southern softwood species, including redwood, red cedar, hemlock, Douglas fir, true firs, pine (e.g., southern pines), spruce (e.g., black spruce), bamboo, combinations thereof, and so forth. Northern softwood kraft pulp fibers may be used in the present invention. An example of commercially available southern softwood kraft pulp fibers suitable for use in the present invention include those available from Weyerhaeuser Company with offices in Federal Way, Washington under the trade designation of "NF-405." Another suitable pulp for use in the present invention is a bleached, sulfate wood pulp containing primarily softwood fibers that is available from Bowater Corp. with offices in Greenville, South Carolina under the trade name Coos-Absorb S pulp. Low-average length fibers may also be used in the present invention. An example of suitable low-average length pulp fibers is hardwood kraft pulp fibers. Hardwood kraft pulp fibers are derived from deciduous trees and include pulp fibers such as, but not limited to, eucalyptus, maple, birch, aspen, etc. Eucalyptus kraft pulp fibers may be particularly desired to increase softness, enhance brightness, increase opacity, and change the pore structure of the sheet to increase its wicking ability. Bamboo or cotton fibers may also be employed.

Nonwoven composites may be formed using a variety of known techniques. For example, the nonwoven composite may be a "coform material" that contains a mixture or stabilized matrix of the thermoplastic composition fibers and an absorbent material. As an example, coform materials may be made by a process in which at least one meltblown die head is arranged near a chute through which the absorbent materials are added to the web while it is forming. Such absorbent materials may include, but are not limited to, pulp fibers, superabsorbent particles, inorganic and/or organic absorbent materials, treated polymeric staple fibers, and so forth. The relative percentages of the absorbent material may vary over a wide range depending on the desired characteristics of the nonwoven composite. For example, the nonwoven composite may contain from about 1 wt. % to about 60 wt. %, in some embodiments from 5 wt. % to about 50 wt. %, and in some embodiments, from about 10 wt. % to about 40 wt. % thermoplastic composition fibers. The nonwoven composite may likewise contain from about 40 wt. % to about 99 wt. %, in some embodiments from 50 wt. % to about 95 wt. %, and in some embodiments, from about 60 wt. % to about 90 wt. % absorbent material. Some examples of such coform materials are disclosed in U.S. Pat. No. 4,100,324 to Anderson, et al.; U.S. Pat. No. 5,284,703 to Everhart, et al.; and U.S. Pat. No. 5,350,624 to Georger, et al.

Nonwoven laminates may also be formed in the present invention in which one or more layers are formed from the thermoplastic composition. For example, the nonwoven web of one layer may be a spunbond that contains the thermoplastic composition, while the nonwoven web of another layer contains thermoplastic composition, other renewable polymer(s), and/or any other polymer (e.g., polyolefins). In one embodiment, the nonwoven laminate contains a meltblown layer positioned between two spunbond layers to form a spunbond/meltblown/spunbond ("SMS") laminate. If desired, the spunbond layer(s) may be formed from the thermoplastic composition. The meltblown layer may be formed from the thermoplastic composition, other renewable polymer(s), and/or any other polymer (e.g., polyolefins) . Various techniques for forming SMS laminates are described in U.S. Pat. No. 4,041,203 to Brock et al.; U.S. Pat. No. 5,213,881 to Timmons, et al.; U.S. Pat. No. 5,464,688 to Timmons, et al.; U.S. Pat. No. 4,374,888 to Bornslaeger; U.S. Pat. No. 5,169,706 to Collier, et al.; and U.S. Pat. No. 4,766,029 to Brock et al., as well as U.S. Patent Application Publication No. 2004/0002273 to Fitting, et al. Of course, the nonwoven laminate may have other configuration and possess any desired number of meltblown and spunbond layers, such as spunbond/meltblown/meltblown/spunbond laminates ("SMMS"), spunbond/meltblown laminates ("SM"), etc. Although the basis weight of the nonwoven laminate may be tailored to the desired application, it generally ranges from about 10 to about 300 grams per square meter ("gsm"), in some embodiments from about 25 to about 200 gsm, and in some embodiments, from about 40 to about 150 gsm.

If desired, the fibers, nonwoven web, etc., may also be annealed to help ensure that they retains the desired shape. Annealing typically occurs at temperatures above the glass transition temperature of the renewable polyester, such as at temperatures of from about 65° to about 120° C., in some embodiments from about 70° C. to about 110° C., and in some embodiments, from about 80° C. to about 100° C. The fibers may also be surface treated using any of a variety of known techniques to improve its properties. For example, high energy beams (e.g., plasma, x-rays, e-beam, etc.) may be used to remove or reduce any skin layers that form on the fibers, to change the surface polarity, embrittle a surface layer, etc. If desired, such surface treatment may be used before and/or after formation of a web, as well as before and/or after cold drawing of the fibers.

IV. Articles

The fibers and/or a web formed therefrom may be used in a wide variety of applications. For example, the fibers may be incorporated into a "medical product", such as gowns, surgical drapes, facemasks, head coverings, surgical caps, shoe coverings, sterilization wraps, warming blankets, heating pads, and so forth. Of course, the fibers may also be used in various other articles. For example, the fibers may be incorporated into an "absorbent article" that is capable of absorbing water or other fluids. Examples of some absorbent articles include, but are not limited to, personal care absorbent articles, such as diapers, training pants, absorbent underpants, incontinence articles, feminine hygiene products (e.g., sanitary napkins), swim wear, baby wipes, mitt wipe, and so forth; medical absorbent articles, such as garments, fenestration materials, underpads, bedpads, bandages, absorbent drapes, and medical wipes; food service wipers; clothing articles; pouches, and so forth. Materials and processes suitable for forming such articles are well known to those skilled in the art. Absorbent articles, for instance, typically include a substantially liquid-impermeable layer (e.g., outer cover), a liquid-permeable layer (e.g., bodyside liner, surge layer, etc.), and an absorbent core. In one embodiment, for example, a nonwoven web formed from the fibers of the present invention may be used to form an outer cover of an absorbent article. If desired, the nonwoven web may be laminated to a liquid-impermeable film that is either vapor-permeable or vapor-impermeable.

The present invention may be better understood with reference to the following examples.

Test Methods

Melt Flow Rate:

The melt flow rate ("MFR") is the weight of a polymer (in grams) forced through an extrusion rheometer orifice (0.0825-inch diameter) when subjected to a load of 2160 grams in 10 minutes, typically at 190° C. or 230° C. Unless otherwise indicated, melt flow rate is measured in accordance with ASTM Test Method D1239 with a Tinius Olsen Extrusion Plastometer.

Thermal Properties:

The glass transition temperature ($T_g$) may be determined by dynamic mechanical analysis (DMA) in accordance with ASTM E1640-09. A Q800 instrument from TA Instruments may be used. The experimental runs may be executed in tension/tension geometry, in a temperature sweep mode in the range from −120° C. to 150° C. with a heating rate of 3° C./min. The strain amplitude frequency may be kept constant (2 Hz) during the test. Three (3) independent samples may be tested to get an average glass transition temperature, which is defined by the peak value of the tan δ curve, wherein tan δ is defined as the ratio of the loss modulus to the storage modulus (tan δ=E"/E').

The melting temperature may be determined by differential scanning calorimetry (DSC). The differential scanning calorimeter may be a DSC Q100 Differential Scanning calorimeter, which may be outfitted with a liquid nitrogen cooling accessory and with a UNIVERSAL ANALYSIS 2000 (version 4.6.6) analysis software program, both of which are available from T.A. Instruments Inc. of New Castle, Delaware. To avoid directly handling the samples, tweezers or other tools may be used. The samples may be placed into an aluminum pan and weighed to an accuracy of 0.01 milligram on an analytical balance. A lid may be crimped over the material sample onto the pan. Typically, the resin pellets may be placed directly in the weighing pan.

The differential scanning calorimeter may be calibrated using an indium metal standard and a baseline correction may be performed, as described in the operating manual for the differential scanning calorimeter. A material sample may be placed into the test chamber of the differential scanning calorimeter for testing, and an empty pan may be used as a reference. All testing may be run with a 55-cubic centimeter per minute nitrogen (industrial grade) purge on the test chamber. For resin pellet samples, the heating and cooling program is a 2-cycle test that began with an equilibration of the chamber to −30° C., followed by a first heating period at a heating rate of 10° C. per minute to a temperature of 200° C., followed by equilibration of the sample at 200° C. for 3 minutes, followed by a first cooling period at a cooling rate of 10° C. per minute to a temperature of −30° C., followed by equilibration of the sample at −30° C. for 3 minutes, and then a second heating period at a heating rate of 10° C. per minute to a temperature of 200° C. For fiber samples, the heating and cooling program may be a 1-cycle test that begins with an equilibration of the chamber to −25° C., followed by a heating period at a heating rate of 10° C. per minute to a temperature of 200° C., followed by equilibration of the sample at 200° C. for 3 minutes, and then a cooling period at a cooling rate of 10° C. per minute to a temperature of −30° C. All testing may be run with a 55-cubic centimeter per minute nitrogen (industrial grade) purge on the test chamber.

The results may be evaluated using the UNIVERSAL ANALYSIS 2000 analysis software program, which identifies and quantifies the glass transition temperature ($T_g$) of inflection, the endothermic and exothermic peaks, and the areas under the peaks on the DSC plots. The glass transition temperature may be identified as the region on the plot-line where a distinct change in slope occurred, and the melting temperature may be determined using an automatic inflection calculation.

Tensile Properties:

The tensile properties may be determined in accordance with ASTM 638-10 at 23° C. For instance, individual fiber specimens may initially be shortened (e.g., cut with scissors) to 38 millimeters in length, and placed separately on a black velvet cloth. 10 to 15 fiber specimens may be collected in this manner. The fiber specimens may then be mounted in a substantially straight condition on a rectangular paper frame having external dimension of 51 millimeters×51 millimeters and internal dimension of 25 millimeters×25 millimeters. The ends of each fiber specimen may be operatively attached to the frame by carefully securing the fiber ends to the sides of the frame with adhesive tape. Each fiber specimen may be measured for its external, relatively shorter, cross-fiber dimension employing a conventional laboratory microscope, which may be properly calibrated and set at 40× magnification. This cross-fiber dimension may be recorded as the diameter of the individual fiber specimen. The frame helps to mount the ends of the sample fiber specimens in the upper and lower grips of a constant rate of extension type tensile tester in a manner that avoids excessive damage to the fiber specimens.

A constant rate of extension type of tensile tester and an appropriate load cell may be employed for the testing. The load cell may be chosen (e.g., 10N) so that the test value falls within 10-90% of the full scale load. The tensile tester (i.e., MTS SYNERGY 200) and load cell may be obtained from MTS Systems Corporation of Eden Prairie, Michigan. The fiber specimens in the frame assembly may then be mounted between the grips of the tensile tester such that the ends of the fibers may be operatively held by the grips of the tensile tester. Then, the sides of the paper frame that extend parallel to the fiber length may be cut or otherwise separated so that the tensile tester applies the test force only to the fibers. The fibers may be subjected to a pull test at a pull rate and grip speed of 12 inches per minute. The resulting data may be analyzed using a TESTWORKS 4 software program from the MTS Corporation with the following test settings:

| Calculation Inputs | | Test Inputs | |
|---|---|---|---|
| Break mark drop | 50% | Break sensitivity | 90% |
| Break marker elongation | 0.1 in | Break threshold | 10 $g_f$ |
| Nominal gage length | 1 in | Data Acq. Rate | 10 Hz |
| Slack pre-load | 1 $lb_f$ | Denier length | 9000 m |
| Slope segment length | 20% | Density | 1.25 g/cm³ |
| Yield offset | 0.20% | Initial speed | 12 in/min |
| Yield segment length | 2% | Secondary speed | 2 in/min |

The tenacity values may be expressed in terms of gram-force per denier. Peak elongation (% strain at break) and peak stress may also be measured.

Expansion Ratio, Density, and Percent Void Volume

To determine expansion ratio, density, and percent void volume, the width ($W_i$) and thickness ($T_i$) of the specimen were initially measured prior to cold drawing. The length ($L_i$) before drawing was also determined by measuring the distance between two markings on a surface of the specimen. Thereafter, the specimen was cold drawn to initiate voiding. The width ($W_f$), thickness ($T_f$), and length ($L_f$) of the specimen was then measured to the nearest 0.01 mm utilizing Digimatic Caliper (Mitutoyo Corporation). The volume ($V_i$) before cold drawing was calculated by $W_i \times T_i \times L_i = V_i$. The volume ($V_f$) after cold drawing was also calculated by $W_f \times T_f \times L_f = V_f$. The expansion ratio ($\Phi$) was calculated by $\Phi = V_f/V_i$; the density ($P_f$) of was calculated by: $P_f = P_i/\Phi$, where $P_i$ is density of precursor material; and the percent void volume (% $V_v$) was calculated by: % $V_v = (1 - 1/\Phi) \times 100$.

Moisture Content

Moisture content may be determined using an Arizona Instruments Computrac Vapor Pro moisture analyzer (Model No. 3100) in substantial accordance with ASTM D 7191-05, which is incorporated herein in its entirety by reference thereto for all purposes. The test temperature (§ X2.1.2) may be 130° C., the sample size (§ X2.1.1) may be 2 to 4 grams, and the vial purge time (§ X2.1.4) may be 30 seconds. Further, the ending criteria (§ X2.1.3) may be defined as a "prediction" mode, which means that the test is ended when the built-in programmed criteria (which mathematically calculates the end point moisture content) is satisfied.

Example 1

PLA 6201 D (Natureworks®, melt flow rate of 10 g/10 minutes at 190° C.) was spun at 240° C. at a throughput of 0.40 grams per hole per minute through a 0.6 mm diameter spinneret. Fibers were collected in free fall (gravity only as draw force) and then tested for mechanical properties at a pull rate of 50 millimeters per minute. No volume expansion was noted in PLA fibers as the PLA fibers failed at a strain at break of only 3.8%.

Example 2

A blend of 85.3 wt. % polylactic acid (PLA 6201D, Natureworks®), 9.5 wt. % of toughening additive, 1.4 wt. % polyepoxide modifier, and 3.8 wt. % interfacial modifier (PLURIOL® WI 285 from BASF) was spun into fibers. The toughening additive was Vistamaxx™ 2120 (ExxonMobil), which is a polyolefin copolymer/elastomer with a melt flow rate of 29 g/10 min (190° C., 2160 g) and a density of 0.866 g/cm³. The polyepoxide modifier was poly(ethylene-co-methyl acrylate-co-glycidyl methacrylate) (Lotader® AX8900, Arkema) having a melt flow rate of 70-100 g/10 min (190° C./2160 g), a glycidyl methacrylate content of 7 to 11 wt. %, methyl acrylate content of 13 to 17 wt. %, and ethylene content of 72 to 80 wt. %. The polymers were fed into a co-rotating, twin-screw extruder (ZSK-30, diameter of 30 mm, length of 1328 millimeters) for compounding that was manufactured by Werner and Pfleiderer Corporation of Ramsey, New Jersey. The extruder possessed 14 zones, numbered consecutively 1-14 from the feed hopper to the die. The first barrel zone #1 received the resins via gravimetric feeder at a total throughput of 15 pounds per hour with the PLURIOL® WI285 was added via injector pump into barrel zone #2. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The extruder screw speed was 200 revolutions per minute ("rpm"). The pellets were then flood fed into a single screw extruder at 240° C., melted and passed through a melt pump at a rate of 0.40 grams per hole per minute through a 0.6 mm diameter spinneret. Fibers were collected in free fall (gravity only as draw force) and then tested for mechanical properties at a pull rate of 50 millimeters per minute. Fibers were then cold drawn at 23° C. in a MTS Synergie Tensile frame at a rate of 50 mm/min. Fibers were drawn to pre-defined strains of 50%, 100%, 150%, 200% and 250%.

After drawing, expansion ratio, void volume and the resulting density were calculated for various strain rates as shown in the tables below.

| Initial Length (mm) | Initial Diameter (mm) | Initial Volume (mm^3) | Strain % | Length after elongation (mm) | Diameter after elongation (mm) | Volume after elongation (mm^3) |
|---|---|---|---|---|---|---|
| 50 | 0.1784 | 1.2498 | 50.0 | 75 | 0.1811 | 1.9319 |
| 50 | 0.2047 | 1.6455 | 100.0 | 100 | 0.2051 | 3.3039 |
| 50 | 0.1691 | 1.1229 | 150.0 | 125 | 0.165 | 2.6728 |
| 50 | 0.242 | 2.2998 | 200.0 | 150 | 0.1448 | 2.4701 |
| 50 | 0.1795 | 1.2653 | 250.0 | 175 | 0.1062 | 1.5502 |

| Strain % | Poisson's Coefficient | Expansion Ratio | Void Volume (%) | Initial Density (g/cc) | Voided Density (g/cc) | Observation |
|---|---|---|---|---|---|---|
| 50 | −0.030 | 1.55 | 35.3 | 1.2 | 0.78 | No necking |
| 100 | −0.002 | 2.01 | 50.2 | 1.2 | 0.60 | No necking |
| 125 | 0.016 | 2.38 | 58.0 | 1.2 | 0.50 | No necking |
| 150 | 0.201 | 1.07 | 6.9 | 1.2 | 1.12 | necking |
| 175 | 0.163 | 1.23 | 18.4 | 1.2 | 0.98 | fully necked |

Example 3

Fibers were formed as described in Example 2, except that they were collected at a collection roll speed of 100 meters per minute resulting in a drawn down ratio of 77. Fibers were then tested for mechanical properties at a pull rate of 50 millimeters per minute. Fibers were then cold drawn at 23° C. in a MTS Synergie Tensile frame at a rate of 50 mm/min. Fibers were drawn to pre-defined strains of 50%, 100%, 150%, 200% and 250%. After drawing, expansion ratio, void volume and the resulting density were calculated for various strain rates as shown in the tables below.

| Initial Length (mm) | Initial Diameter (mm) | Initial Volume (mm^3) | Strain % | Length after elongation (mm) | Diameter after elongation (mm) | Volume after elongation (mm^3) |
|---|---|---|---|---|---|---|
| 50 | 0.057 | 0.1276 | 50.0 | 75 | 0.0575 | 0.1948 |
| 50 | 0.0601 | 0.1418 | 100.0 | 100 | 0.0609 | 0.2913 |
| 50 | 0.067 | 0.1763 | 150.0 | 125 | 0.0653 | 0.4186 |
| 50 | 0.0601 | 0.1418 | 200.0 | 150 | 0.058 | 0.3963 |
| 50 | 0.0601 | 0.1418 | 200.0 | 150 | 0.0363 | 0.1552 |
| 50 | 0.059 | 0.1367 | 250.0 | 175 | 0.0385 | 0.2037 |

| Strain % | Poisson's Coefficient | Expansion Ratio | Void Volume (%) | Initial Density (g/cc) | Voided Density (g/cc) | Observation |
|---|---|---|---|---|---|---|
| 50 | −0.018 | 1.53 | 34.5 | 1.2 | 0.79 | 1 small neck ~1 mm in length |
| 100 | −0.013 | 2.05 | 51.3 | 1.2 | 0.58 | 2 small necks approximately 5 mm in length |
| 150 | 0.017 | 2.37 | 57.9 | 1.2 | 0.51 | No visible necking fiber looks to be uniform |
| 200 | 0.017 | 2.79 | 64.2 | 1.2 | 0.43 | Note average diameter taken from necked and non-necked regions |
| 200 | 0.198 | 1.09 | 8.6 | 1.2 | 1.10 | Diameter only taken from necked region |
| 250 | 0.139 | 1.49 | 32.9 | 1.2 | 0.81 | Fully necked |

Example 4

Fibers were formed as described in Example 2, except that the blend was composed of 84.6 wt. % polylactic acid (PLA 6201D, Natureworks®), 9.4 wt. % of toughening additive Vistamaxx™ 2120 (ExxonMobil), 1.3 wt. % polyepoxide modifier (Lotader® AX8900, Arkema), and 4.5 wt. % interfacial modifier HALLGREEN® IM-8830 from Hallstar. The HALLGREEN® IM-8830 was added via injector pump into barrel zone #2. Fibers were collected at 240° C., 0.40 ghm and under free fall.

Example 5

Fibers were formed as described in Example 4, except that they were collected at a collection roll speed of 100 meters per minute resulting in a drawn down ratio of 77. Fibers were then cold drawn at 23° C. in a MTS Synergie Tensile frame at a rate of 50 mm/min. Fibers were drawn to pre-defined strain of 100%.

Example 6

Fibers were formed as described in Example 2, except that the blend was composed of 85.3 wt. % polylactic acid (PLA 6201D, Natureworks®), 9.5 wt. % of toughening additive Exceed™ 3512CB resin (ExxonMobil), 1.4 wt. % polyepoxide modifier (Lotader® AX8900, Arkema), and 3.8% wt. % interfacial modifier (PLURIOL® WI 285 from BASF). The PLURIOL® WI285 was added via injector pump into barrel zone #2. Fibers were collected at 240° C., 0.40 ghm and under free fall.

Example 7

Fibers were formed as described in Example 6, except that they were collected at a collection roll speed of 100 meters per minute resulting in a drawn down ratio of 77. Fibers were then cold drawn at 23° C. in a MTS Synergie Tensile frame at a rate of 50 mm/min. Fibers were drawn to pre-defined strain of 100%.

Example 8

Fibers were formed as described in Example 2, except that the blend was composed of 85.3 wt. % polylactic acid (PLA 6201D, Natureworks®), 9.5 wt. % of toughening additive Escorene™ UL EVA 7720 (ExxonMobil), 1.4 wt. % polyepoxide modifier (Lotader® AX8900, Arkema), and 3.8% wt. % interfacial modifier (PLURIOL® WI 285 from BASF). The PLURIOL® WI285 was added via injector pump into barrel zone #2. Fibers were collected at 240° C., 0.40 ghm and free fall.

Example 9

Fibers were formed as described in Example 8, except that they were collected at a collection roll speed of 100 meters per minute resulting in a drawn down ratio of 77. Fibers were then tested for mechanical properties at a pull rate of 50 millimeters per minute Fibers were then cold drawn at 23° C. in a MTS Synergie Tensile frame at a rate of 50 mm/min. Fibers were drawn to pre-defined strain of 100%.

Example 10

Fibers were formed as described in Example 2, except that the blend was composed of 83.7 wt. % polylactic acid (PLA 6201D, Natureworks®), 9.3 wt. % of toughening additive Vistamaxx™ 2120 (ExxonMobil), 1.4 wt. % polyepoxide modifier (Lotader® AX8900, Arkema), 3.7% wt. % internal interfacial modifier (PLURIOL® WI 285 from BASF) and 1.9% hydrophilic surfactant (Masil SF-19). The PLURIOL® WI285 and Masil SF-19 were premixed at a 2:1 (WI-285:SF-19) ratio and added via injector pump into barrel zone #2. Fibers were collected at 240° C., 0.40 ghm and under free fall.

Example 11

Fibers were formed as described in Example 10, except that they were collected at a collection roll speed of 100 meters per minute resulting in a drawn down ratio of 77. Fibers were then tested for mechanical properties at a pull rate of 50 millimeters per minute. Fibers were then cold drawn at 23° C. in a MTS Synergie Tensile frame at a rate of 50 mm/min. Fibers were drawn to pre-defined strain of 100%.

After drawing, the expansion ratio, void volume and density were calculated for Examples 6, 7, 9, and 11 as shown in the tables below.

| Example | Initial Length (mm) | Initial Diameter (mm) | Initial Volume mm^3 | Strain % | Length after elongation (mm) | Diameter after elongation (mm) | Volume after elongation (mm^3) |
|---|---|---|---|---|---|---|---|
| 5 | 50 | 0.0639 | 0.1603 | 100.0 | 100 | 0.063 | 0.3117 |
| 7 | 50 | 0.0587 | 0.1353 | 100.0 | 100 | 0.0406 | 0.1295 |
| 9 | 50 | 0.0562 | 0.1240 | 100.0 | 100 | 0.0566 | 0.2516 |
| 11 | 50 | 0.0626 | 0.1539 | 100.0 | 100 | 0.0493 | 0.1909 |

| Example | Poisson's Coefficient | Expansion Ratio | Void Volume (%) | Initial Density (g/cc) | Voided Density (g/cc) | Observation |
|---|---|---|---|---|---|---|
| 5 | 0.0141 | 1.94 | 48.6 | 1.2 | 0.62 | Uniform across fiber no localized necking |
| 7 | 0.3083 | 0.96 | −4.5 | 1.2 | 1.25 | Localized necking throughout . . . assumed necked area to be 50% of tested area and averaged neck and non-necked diameters |
| 9 | −0.0071 | 2.03 | 50.7 | 1.2 | 0.59 | Uniform across fiber no localized necking |
| 11 | 0.2125 | 1.24 | 19.4 | 1.2 | 0.97 | Localized necking throughout . . . assumed necked area to be 50% of tested area and averaged neck and non-necked diameters |

Example 12

Fibers from Example 10 were stretched in a MTS Synergie Tensile frame at a rate of 50 millimeters per minute to 250% strain. This opened up the void structure and turned the fiber white. A one inch sample was then cut from the stressed, white area of the fiber. The new fiber was then tested as described above. The density was estimated to be 0.75 grams per cubic centimeters and the pull rate for the tensile test was 305 mm/min.

Example 13

Fibers from Example 3 were heated in an oven at 50° C. for 30 minutes to anneal the fiber.

Example 14

Fibers from Example 3 were heated in an oven at 90° C. for 5 minutes to anneal the fiber and induce crystallization.

Example 15

Fibers were formed as described in Example 8, except that they were collected at a collection roll speed of 500 meters per minute. This resulted in a drawn down ratio of 387.

Example 16

Fibers were formed as described in Example 8, except that they were collected at a collection roll speed of 1000 meters per minute. This resulted in a drawn down ratio of 775.

Example 17

The fibers of Examples 1-16 were then tested for mechanical properties at a pull rate of 50 millimeters per minute. The results are set forth in the table below.

| Example | Diameter (um) | Peak Load (g) | Peak Stress (MPa) | Strain at Break (%) | Energy to Break (J/cm^3) | Tenacity (g/g) | Density (g/cc) |
|---|---|---|---|---|---|---|---|
| 1 | 207.8 | 217.06 | 62.8 | 3.8 | 0.8 | 0.57 | 1.25 |
| 2 | 184.6 | 126.65 | 47.3 | 484.5 | 154.0 | 0.44 | 1.20 |
| 3 | 62.2 | 22.57 | 73.1 | 464.1 | 205.1 | 0.69 | 1.20 |
| 4 | 186.5 | 130.08 | 46.7 | 516.8 | 149.6 | 0.44 | 1.20 |
| 6 | 150.2 | 80.05 | 43.5 | 107.2 | 34.2 | 0.42 | 1.20 |
| 8 | 213.0 | 172.38 | 46.9 | 478.3 | 148.8 | 0.45 | 1.20 |
| 9 | 66.5 | 20.90 | 58.8 | 423.8 | 155.4 | 0.56 | 1.20 |
| 10 | 128.5 | 70.32 | 53.2 | 635.3 | 216.0 | 0.50 | 1.20 |
| 11 | 59.1 | 16.17 | 57.8 | 495.8 | 184.4 | 0.55 | 1.20 |
| 12 | 108.5 | 92.95 | 101.3 | 110.8 | 71.2 | 1.49 | −0.75 |
| 13 | 67.5 | 24.48 | 66.9 | 467.7 | 195.2 | 0.63 | 1.20 |
| 14 | 62.6 | 19.55 | 62.2 | 351.0 | 154.4 | 0.59 | 1.20 |
| 15 | 30.0 | 5.462 | 76.1 | 168.2 | 92.3 | 0.71 | 1.20 |
| 16 | 17.3 | 2.785 | 120.1 | 93.3 | 81.6 | 1.09 | 1.20 |

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method for forming a low density fiber, the method comprising:
    forming a blend that contains a polyester and a polymeric toughening additive, wherein the polyester has a glass transition temperature of about 0° C. or more, wherein the fiber contains domains of the polymeric toughening additive with an axial dimension ranging from about 0.05 μm to about 30 μm;
    extruding the blend through a die to form the fiber; and
    drawing the fiber at a temperature that is lower than the glass transition temperature of the polyester to form a thermoplastic composition that contains a plurality of voids and has a density of about 1.4 grams per cubic centimeter or less, wherein the axial dimension of the voids is about 5 micrometers or less.

2. The method of claim 1, further comprising annealing the drawn fiber at a temperature that is above the glass transition temperature of the polyester.

3. The method of claim 1, wherein the fiber has a density of from about 0.5 grams per cubic centimeter to about 0.95 grams per cubic centimeter.

4. The method of claim 1, wherein the average percent volume of the fiber that is occupied by the voids is from about 20% to about 80% per cubic centimeter.

5. The method of claim 1, wherein the polyester is a polylactic acid.

6. The method of claim 1, wherein the polymeric toughening additive includes a propylene homopolymer, propylene/α-olefin copolymer, ethylene/α-olefin copolymer, or a combination thereof.

7. The method of claim 1, wherein the blend comprises at least one interphase modifier.

8. The method of claim 1, wherein the blend further comprises a polyepoxide modifier that includes an epoxy-functional (meth)acrylic monomeric component.

9. The method of claim 1, wherein the fiber is drawn to a stretch ratio of from about 1.1 to about 3.0.

10. The method of claim 1, wherein the fiber is drawn at a temperature at least about 10° C. below the glass transition temperature of the polyester.

11. The method of claim 1, wherein the blend is generally free of gaseous blowing agents.

* * * * *